United States Patent
Ma et al.

(10) Patent No.: US 11,785,643 B2
(45) Date of Patent: Oct. 10, 2023

(54) PHYSICAL RANDOM ACCESS CHANNEL PROCEDURE

(71) Applicant: QUALCOMM Incorporated, San Diego, CA (US)

(72) Inventors: Liangping Ma, San Diego, CA (US); Xiao Feng Wang, San Diego, CA (US); Peter Gaal, San Diego, CA (US); Alberto Rico Alvarino, San Diego, CA (US); Ayan Sengupta, San Diego, CA (US); Juan Montojo, San Diego, CA (US); Jun Ma, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 17/148,283

(22) Filed: Jan. 13, 2021

(65) Prior Publication Data

US 2022/0225414 A1 Jul. 14, 2022

(51) Int. Cl.
*H04W 74/08* (2009.01)
*H04B 7/06* (2006.01)
*H04L 27/26* (2006.01)
*H04L 41/0803* (2022.01)

(52) U.S. Cl.
CPC ...... *H04W 74/0833* (2013.01); *H04B 7/0602* (2013.01); *H04L 27/2605* (2013.01); *H04L 41/0803* (2013.01)

(58) Field of Classification Search
CPC .......... H04W 74/08; H04W 74/0833; H04B 7/0602; H04L 27/2605; H04L 41/0803
See application file for complete search history.

(56) References Cited

U.S. PATENT DOCUMENTS

| | | | |
|---|---|---|---|
| 2008/0043671 | A1 | 2/2008 | Moon et al. |
| 2009/0161599 | A1 | 6/2009 | Haartsen et al. |
| 2012/0082192 | A1 | 4/2012 | Pelletier et al. |
| 2014/0044108 | A1 | 2/2014 | Earnshaw et al. |
| 2019/0274172 | A1 | 9/2019 | Yoon et al. |
| 2019/0342925 | A1* | 11/2019 | Zhang .................... H04W 52/50 |
| 2020/0107235 | A1* | 4/2020 | Peisa .................... H04B 7/0695 |

(Continued)

FOREIGN PATENT DOCUMENTS

WO 2019195457 A1 10/2019

OTHER PUBLICATIONS

International Search Report and Written Opinion—PCT/US2021/072850—ISA/EPO—dated Jul. 6, 2022.

(Continued)

*Primary Examiner* — Kent Krueger

(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a random access channel configuration that indicates one or more physical random access channel (PRACH) formats associated with antenna switching. The UE may transmit, to the base station, a PRACH sequence using a PRACH format associated with antenna switching from the one or more PRACH formats associated with antenna switching. Numerous other aspects are described.

30 Claims, 17 Drawing Sheets

(56) References Cited

U.S. PATENT DOCUMENTS

2020/0275492 A1     8/2020   Lei et al.
2021/0029658 A1     1/2021   Mahalingam et al.

OTHER PUBLICATIONS

Partial International Search Report—PCT/US2021/072850—ISA/EPO—dated Apr. 7, 2022.

Qualcomm Incorporated: "BWP Operation and Other Issues for NTN", 3GPP Draft, 3GPP TSG RAN WG1 #104-e, R1-2101467, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), XP051971632, 13 Pages, Retrieved from the Internet: URL: https://ftp.3gpp.org/tsg_ran/WG1_RL1/TSGR1_104-e/Docs/R1-2101467.zip R1-2101467 BWP Operations and Other Issues for NTN.docx [Retrieved on Jan. 19, 2021] Section 2.9.

Samsung: "Antenna Switching Transmission of RACH Preamble", 3GPP Draft, 3GPP RAN WG1 Meeting #47, R1-063252, RACH Antenna Switching, 3rd Generation Partnership Project (3GPP), Mobile Competence Centre, 650, Route Des Lucioles, F-06921 Sophia-Antipolis Cedex, France, vol. RAN WG1, No. Riga, Latvia, Nov. 1, 2006, Nov. 1, 2006 (Nov. 1, 2006), XP050103702, 2 Pages, [Retrieved on Nov. 1, 2006] The Whole Document.

\* cited by examiner

PHYSICAL RANDOM ACCESS CHANNEL PROCEDURE

FIELD OF THE DISCLOSURE

Aspects of the present disclosure generally relate to wireless communication and to techniques and apparatuses for physical random access channel (PRACH) procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to: receive, from a base station, a random access channel configuration that indicates one or more physical random access channel (PRACH) formats associated with antenna switching; and transmit, to the base station, a PRACH sequence using a PRACH format associated with antenna switching from the one or more PRACH formats associated with antenna switching.

In some aspects, a base station for wireless communication includes a memory and one or more processors operatively coupled to the memory, the memory and the one or more processors configured to: transmit, to a UE, a random access channel configuration that indicates one or more PRACH formats associated with antenna switching; and receive, from the UE, a PRACH sequence that uses a PRACH format associated with antenna switching from the one or more PRACH formats associated with antenna switching.

In some aspects, a UE for wireless communication includes a memory and one or more processors operatively coupled to the memory, the memory and the one or more processors configured to: receive, from a base station, an indication of resources to be used for a PRACH sequence, wherein resources reserved by the base station include more resources in a time domain than the resources to be used for the PRACH sequence; determine a transmission timing for the PRACH sequence based at least in part on an estimated propagation delay between the UE and the base station; and transmit, to the base station, the PRACH sequence in accordance with the transmission timing.

In some aspects, a base station for wireless communication includes a memory and one or more processors operatively coupled to the memory, the memory and the one or more processors configured to: determine a first set of resources to be used for a PRACH sequence to be transmitted by a UE; determine a second set of resources to reserve for receiving the PRACH sequence, wherein the first set of resources and the second set of resources at least partially overlap in a time domain; transmit, to the UE, an indication of the first set of resources to be used for the PRACH sequence; and receive, from the UE, the PRACH sequence using resources included in the second set of resources.

In some aspects, a method of wireless communication performed by a UE includes receiving, from a base station, a random access channel configuration that indicates one or more PRACH formats associated with antenna switching; and transmitting, to the base station, a PRACH sequence using a PRACH format associated with antenna switching from the one or more PRACH formats associated with antenna switching.

In some aspects, a method of wireless communication performed by a base station includes transmitting, to a UE, a random access channel configuration that indicates one or more PRACH formats associated with antenna switching; and receiving, from the UE, a PRACH sequence that uses a PRACH format associated with antenna switching from the one or more PRACH formats associated with antenna switching.

In some aspects, a method of wireless communication performed by a UE includes receiving, from a base station, an indication of resources to be used for a PRACH sequence, wherein resources reserved by the base station include more resources in a time domain than the resources to be used for the PRACH sequence; determining a transmission timing for the PRACH sequence based at least in part on an estimated propagation delay between the UE and the base station; and transmitting, to the base station, the PRACH sequence in accordance with the transmission timing.

In some aspects, a method of wireless communication performed by a base station includes determining a first set of resources to be used for a PRACH sequence to be transmitted by a UE; determining a second set of resources to reserve for receiving the PRACH sequence, wherein the first set of resources and the second set of resources at least partially overlap in a time domain; transmitting, to the UE, an indication of the first set of resources to be used for the PRACH sequence; and receiving, from the UE, the PRACH sequence using resources included in the second set of resources.

In some aspects, a non-transitory computer-readable medium storing a set of instructions for wireless communication includes one or more instructions that, when executed by one or more processors of a UE, cause the UE to: receive, from a base station, a random access channel configuration that indicates one or more PRACH formats associated with antenna switching; and transmit, to the base station, a PRACH sequence using a PRACH format associated with antenna switching from the one or more PRACH formats associated with antenna switching.

In some aspects, a non-transitory computer-readable medium storing a set of instructions for wireless communication includes one or more instructions that, when executed by one or more processors of a base station, cause the base station to: transmit, to a UE, a random access channel configuration that indicates one or more PRACH formats associated with antenna switching; and receive, from the UE, a PRACH sequence that uses a PRACH format associated with antenna switching from the one or more PRACH formats associated with antenna switching.

In some aspects, a non-transitory computer-readable medium storing a set of instructions for wireless communication includes one or more instructions that, when executed by one or more processors of an UE, cause the UE to: receive, from a base station, an indication of resources to be used for a PRACH sequence, wherein resources reserved by the base station include more resources in a time domain than the resources to be used for the PRACH sequence; determine a transmission timing for the PRACH sequence based at least in part on an estimated propagation delay between the UE and the base station; and transmit, to the base station, the PRACH sequence in accordance with the transmission timing.

In some aspects, a non-transitory computer-readable medium storing a set of instructions for wireless communication includes one or more instructions that, when executed by one or more processors of a base station, cause the base station to: determine a first set of resources to be used for a PRACH sequence to be transmitted by a UE; determine a second set of resources to reserve for receiving the PRACH sequence, wherein the first set of resources and the second set of resources at least partially overlap in a time domain; transmit, to the UE, an indication of the first set of resources to be used for the PRACH sequence; and receive, from the UE, the PRACH sequence using resources included in the second set of resources.

In some aspects, an apparatus for wireless communication includes means for receiving, from a base station, a random access channel configuration that indicates one or more PRACH formats associated with antenna switching; and means for transmitting, to the base station, a PRACH sequence using a PRACH format associated with antenna switching from the one or more PRACH formats associated with antenna switching.

In some aspects, an apparatus for wireless communication includes means for transmitting, to a UE, a random access channel configuration that indicates one or more PRACH formats associated with antenna switching; and means for receiving, from the UE, a PRACH sequence that uses a PRACH format associated with antenna switching from the one or more PRACH formats associated with antenna switching.

In some aspects, an apparatus for wireless communication includes means for receiving, from a base station, an indication of resources to be used for a PRACH sequence, wherein resources reserved by the base station include more resources in a time domain than the resources to be used for the PRACH sequence; means for determining a transmission timing for the PRACH sequence based at least in part on an estimated propagation delay between the UE and the base station; and means for transmitting, to the base station, the PRACH sequence in accordance with the transmission timing.

In some aspects, an apparatus for wireless communication includes means for determining a first set of resources to be used for a PRACH sequence to be transmitted by a UE; means for determining a second set of resources to reserve for receiving the PRACH sequence, wherein the first set of resources and the second set of resources at least partially overlap in a time domain; means for transmitting, to the UE, an indication of the first set of resources to be used for the PRACH sequence; and means for receiving, from the UE, the PRACH sequence using resources included in the second set of resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
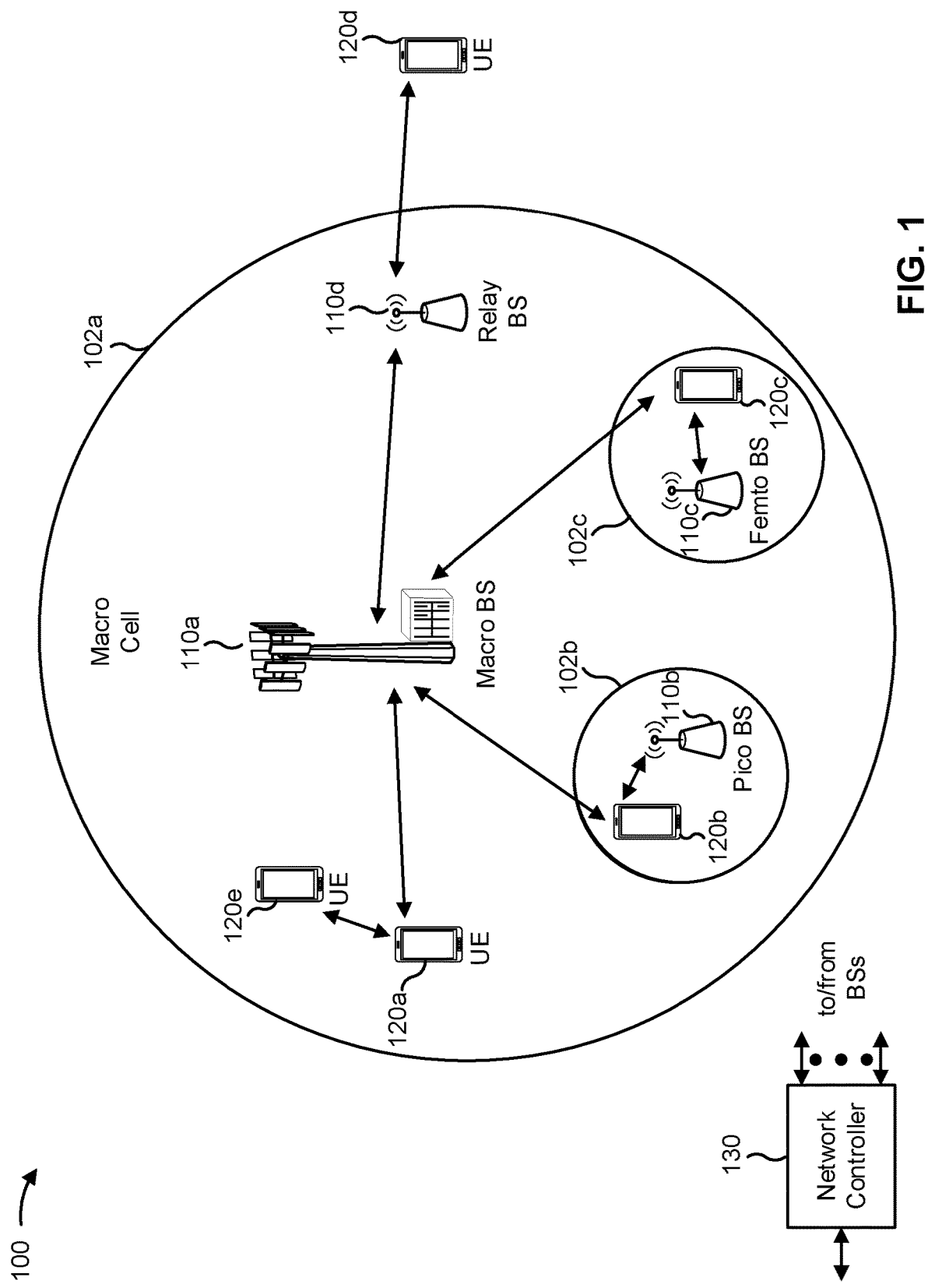
FIG. 1 is a diagram illustrating an example of a wireless network.

FIG. 1 is a diagram illustrating an example of a wireless network 100. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB" "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band.

Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
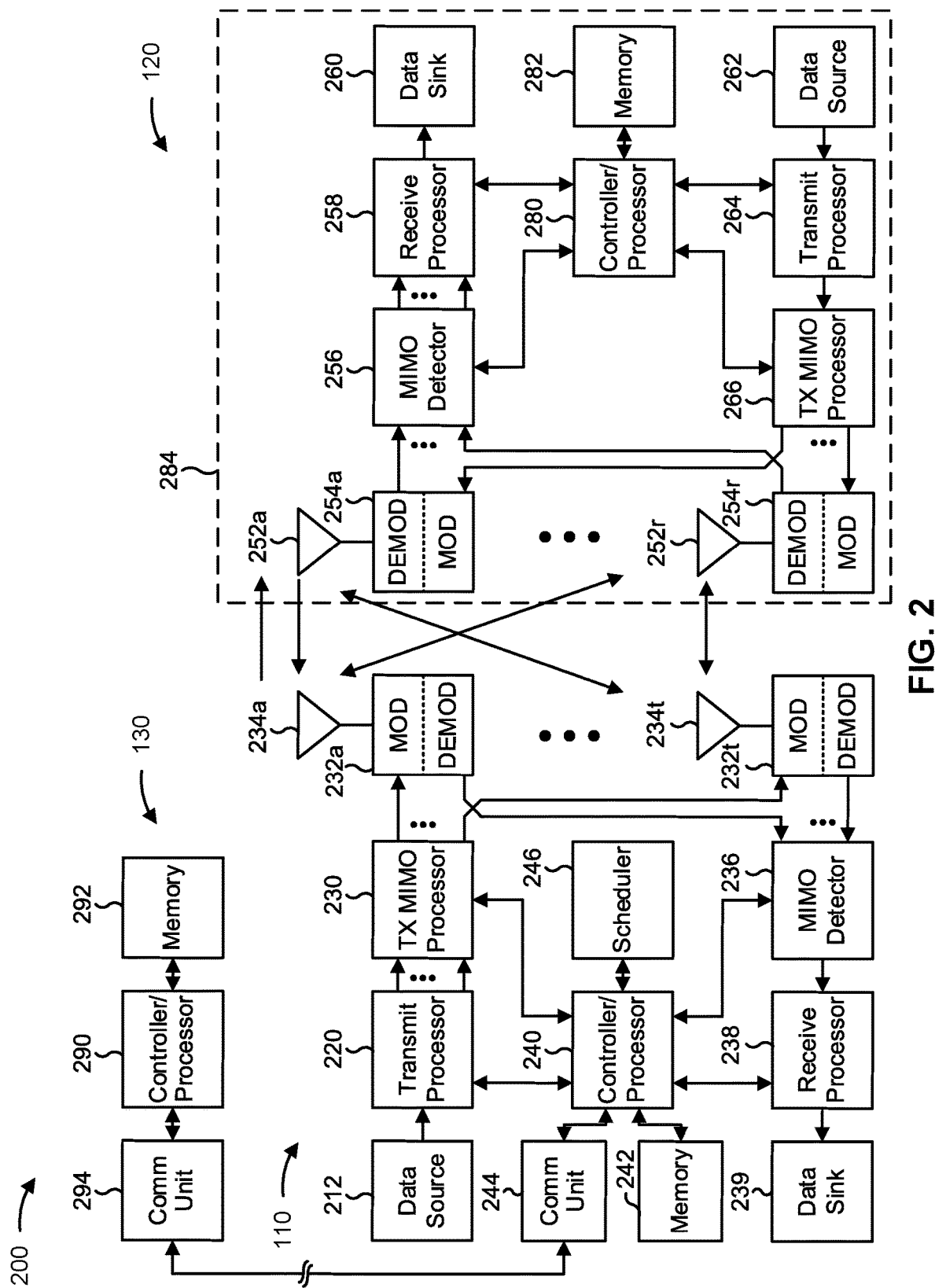
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6, 7, 8, 9, 10, 11, 12, and/or 13.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6, 7, 8, 9, 10, 11, 12, and/or 13.

Controller/processor 240 of base station 110, controller/processor 280 of UE 120, and/or any other component(s) of FIG. 2 may perform one or more techniques associated with a physical random access channel (PRACH) procedure, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, the UE 120 includes means for receiving, from a base station, a random access channel configuration that indicates one or more PRACH formats associated with antenna switching; and/or means for transmitting, to the base station, a PRACH sequence using a PRACH format associated with antenna switching from the one or more PRACH formats associated with antenna switching. Tc means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for transmitting, to the base station, an indication of an antenna switching capability of the UE. In some aspects, the UE 120 includes means for transmitting an indication of whether the UE supports transmit antenna switching. In some aspects, the UE 120 includes means for transmitting an indication of at least one of: a number of antennas supported by the UE for uplink transmit antenna switching, or an antenna switching delay associated with the UE.

In some aspects, the UE 120 includes means for transmitting a first one or more repetitions of the PRACH sequence using a first antenna; means for performing, at an antenna switch time, an antenna switch procedure to switch a transmit antenna from the first antenna to a second antenna; and/or means for transmitting a second one or more repetitions of the PRACH sequence using the second antenna.

In some aspects, the UE 120 includes means for identifying the antenna switch time based at least in part on a stored configuration. In some aspects, the UE 120 includes means for receiving an indication of the antenna switch time.

In some aspects, the UE 120 includes means for receiving an indication of the PRACH format from the one or more PRACH formats, wherein the PRACH format indicates that the PRACH sequence is to include one or more repetitions and indicates that the UE is to perform antenna switching when transmitting the PRACH sequence.

In some aspects, the UE 120 includes means for receiving an indication of the PRACH format from the one or more PRACH formats; and/or means for receiving an indication of whether the UE is to perform antenna switching when transmitting the PRACH sequence using the PRACH format.

In some aspects, the UE 120 includes means for receiving an indication of a first set of random access channel occasions that are associated with antenna switching by the UE and a second set of random access channel occasions that are not associated with antenna switching by the UE.

In some aspects, the UE 120 includes means for receiving an indication of a random access channel occasion, included in the first set of random access channel occasions or the second set of random access channel occasions, associated with the PRACH sequence; and/or means for determining whether to perform antenna switching when transmitting the PRACH sequence based at least in part on whether the random access channel occasion is included in the first set of random access channel occasions or the second set of random access channel occasions.

In some aspects, the UE 120 includes means for receiving an indication of the PRACH format from the one or more PRACH formats, wherein the PRACH format includes one or more repetition groups and an indication that antenna switching is to be used by the UE when transmitting the PRACH sequence.

In some aspects, the UE 120 includes means for receiving an indication that the UE is to perform an antenna switching procedure at the end of at least one of the one or more repetition groups.

In some aspects, the UE 120 includes means for receiving an indication of a starting time of each repetition group included in the one or more repetition groups, wherein the starting time is based at least in part on an amount of time associated with an antenna switching capability of the UE.

In some aspects, the UE 120 includes means for receiving an indication of a time gap between each repetition group included in the one or more repetition groups.

In some aspects, the UE 120 includes means for transmitting a first repetition group of the one or more repetition groups of the PRACH sequence using a first antenna; means for performing, after transmitting the first repetition group, an antenna switch procedure to switch a transmit antenna from the first antenna to a second antenna; and/or means for transmitting a second repetition group of the one or more repetition groups of the PRACH sequence using the second antenna.

In some aspects, the base station 110 includes means for transmitting, to a UE, a random access channel configuration that indicates one or more PRACH formats associated with antenna switching; and/or means for receiving, from the UE, a PRACH sequence that uses a PRACH format associated with antenna switching from the one or more PRACH formats associated with antenna switching. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for receiving, from the UE, an indication of an antenna switching capability of the UE. In some aspects, the base station 110 includes means for receiving an indication of whether the UE supports transmit antenna switching. In some aspects, the base station 110 includes means for receiving an indication of at least one of: a number of antennas supported by the UE for uplink transmit antenna switching, or an antenna switching delay associated with the UE.

In some aspects, the base station 110 includes means for receiving a first one or more repetitions of the PRACH sequence that are transmitted by the UE using a first antenna of the UE; and/or means for receiving a second one or more repetitions of the PRACH sequence that are transmitted by the UE using a second antenna of the UE.

In some aspects, the base station 110 includes means for transmitting an indication of a time that the UE is to perform an antenna switch procedure from the first antenna to the second antenna.

In some aspects, the base station 110 includes means for transmitting an indication of the PRACH format from the one or more PRACH formats, wherein the PRACH format indicates that the PRACH sequence is to include one or more repetitions and indicates that the UE is to perform antenna switching when transmitting the PRACH sequence.

In some aspects, the base station 110 includes means for transmitting an indication of the PRACH format from the one or more PRACH formats; and/or means for transmitting an indication of whether the UE is to perform antenna switching when transmitting the PRACH sequence using the PRACH format.

In some aspects, the base station 110 includes means for transmitting, to the UE, an indication of a first set of random access channel occasions that are associated with antenna switching by the UE and a second set of random access channel occasions that are not associated with antenna switching by the UE.

In some aspects, the base station 110 includes means for transmitting an indication of a random access channel occasion, included in the first set of random access channel occasions or the second set of random access channel occasions, associated with the PRACH sequence.

In some aspects, the base station 110 includes means for transmitting an indication of the PRACH format from the one or more PRACH formats, wherein the PRACH format includes one or more repetition groups and an indication that antenna switching is to be used by the UE when transmitting the PRACH sequence.

In some aspects, the base station 110 includes means for transmitting an indication that the UE is to perform an antenna switching procedure at the end of at least one of the one or more repetition groups.

In some aspects, the base station 110 includes means for transmitting an indication of a starting time of each repetition group included in the one or more repetition groups, wherein the starting time is based at least in part on an amount of time associated with an antenna switching capability of the UE.

In some aspects, the base station 110 includes means for transmitting an indication of a time gap between each repetition group included in the one or more repetition groups.

In some aspects, the base station 110 includes means for receiving a first repetition group of the one or more repetition groups of the PRACH sequence that is transmitted by the UE using a first antenna of the UE; and/or means for receiving a second repetition group of the one or more repetition groups of the PRACH sequence that is transmitted by the UE using a second antenna of the UE.

In some aspects, the UE 120 includes means for receiving, from a base station, an indication of resources to be used for a PRACH sequence, wherein resources reserved by the base station include more resources in a time domain than the resources to be used for the PRACH sequence; means for determining a transmission timing for the PRACH sequence based at least in part on an estimated propagation delay between the UE and the base station; and/or means for transmitting, to the base station, the PRACH sequence in accordance with the transmission timing. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving an indication of a timing offset value; and/or means for determining the transmission timing for the PRACH sequence based at least in part on the timing offset value.

In some aspects, the UE 120 includes means for identifying a first cyclic prefix duration based at least in part on a PRACH format of the PRACH sequence; and/or means for modifying the first cyclic prefix duration by a factor to obtain a second cyclic prefix duration; and/or means for transmitting the PRACH sequence with a cyclic prefix having the second cyclic prefix duration.

In some aspects, the UE 120 includes means for identifying a timing offset value that is based at least in part on the second cyclic prefix duration, means for determining the transmission timing for the PRACH sequence based at least in part on the timing offset value.

In some aspects, the UE 120 includes means for determining a first timing value that is based on the resources to be used for the PRACH sequence; means for subtracting, from the first timing value, the estimated propagation delay to obtain a second timing value; and/or means for adding, to the second timing value, a timing offset value to obtain a third timing value.

In some aspects, the UE 120 includes means for transmitting the PRACH sequence at the third timing value.

In some aspects, the base station 110 includes means for determining a first set of resources to be used for a PRACH sequence to be transmitted by a UE; means for determining a second set of resources to reserve for receiving the PRACH sequence, wherein the first set of resources and the second set of resources at least partially overlap in a time domain; means for transmitting, to the UE, an indication of the first set of resources to be used for the PRACH sequence; and/or means for receiving, from the UE, the PRACH sequence using resources included in the second set of resources. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for determining that the second set of resources is to include: time domain resources that occur prior to time domain resources of the first set of resources, and time domain resources that occur after the time domain resources of the first set of resources.

In some aspects, the base station 110 includes means for determining that the second set of resources is to include time domain resources that occur after the time domain resources of the first set of resources.

In some aspects, the base station 110 includes means for determining that the second set of resources is to include additional time domain resources than time domain resources of the first set of resources, wherein an amount of the additional time domain resources is based at least in part on at least one of: a duration of a cyclic prefix of the PRACH sequence, a negative propagation delay estimated by the UE, or a positive propagation delay estimated by the UE.

In some aspects, the base station 110 includes means for transmitting an indication of a timing offset value to be used by the UE for a transmission timing of the PRACH sequence.

In some aspects, the base station 110 includes means for identifying a first cyclic prefix duration based at least in part on a PRACH format of the PRACH sequence; means for modifying the first cyclic prefix duration by a factor to obtain a second cyclic prefix duration; and/or means for transmitting, to the UE, an indication of the second cyclic prefix duration to be used by the UE for the PRACH sequence.

In some aspects, the base station 110 includes means for identifying a timing offset value that is based at least in part on the second cyclic prefix duration; and/or means for transmitting, to the UE, an indication of the timing offset value.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
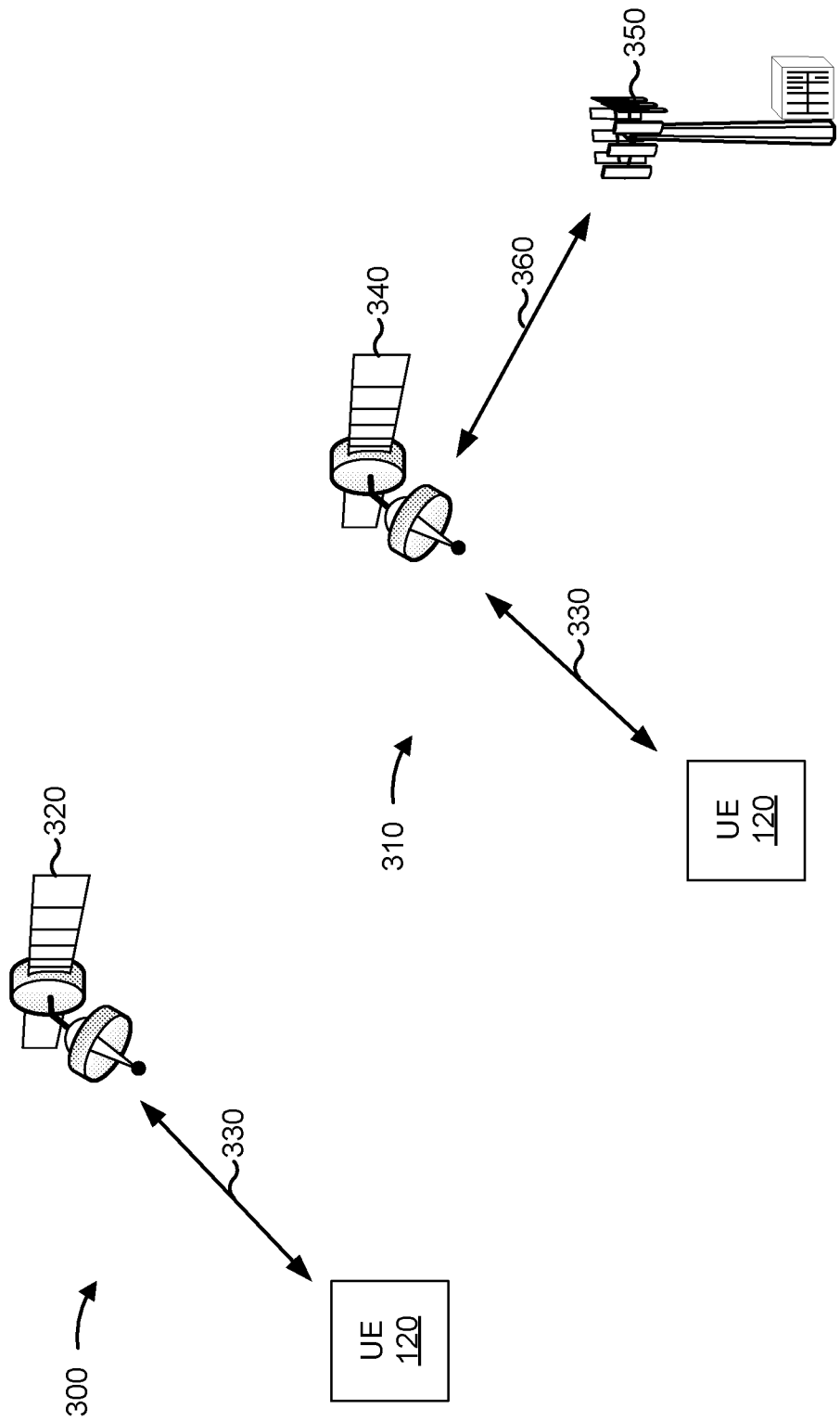
FIG. 3 is a diagram illustrating an example of a regenerative satellite deployment and an example of a transparent satellite deployment in a non-terrestrial network (NTN).

FIG. 3 is a diagram illustrating an example 300 of a regenerative satellite deployment and an example 310 of a transparent satellite deployment in a non-terrestrial network (NTN).

Example 300 shows a regenerative satellite deployment. In example 300, a UE 120 is served by a satellite 320 via a service link 330. For example, the satellite 320 may include a base station 110 (e.g., base station 110*a*) or a gNB. In some aspects, the satellite 320 may be referred to as a non-terrestrial base station, a regenerative repeater, or an on-board processing repeater. In some aspects, the satellite 320 may demodulate an uplink radio frequency signal and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from gateway 350 via a feeder link 360. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360 and may amplify and/or filter the uplink radio frequency transmission.

In some aspects, the UEs 120 shown in example 300 and example 310 may be associated with a Global Navigation Satellite System (GNSS) capability or a Global Positioning System (GPS) capability, though not all UEs have such capabilities. The satellite 340 may provide a cell that covers the UE 120.

The service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120). An uplink of the service link 330 may be indicated by reference number 330-U (not shown in FIG. 3) and a downlink of the service link 330 may be indicated by reference number 330-D (not shown in FIG. 3). Similarly, an uplink of the feeder link 360 may be indicated by reference number 360-U (not shown in FIG. 3) and a downlink of the feeder link 360 may be indicated by reference number 360-D (not shown in FIG. 3).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
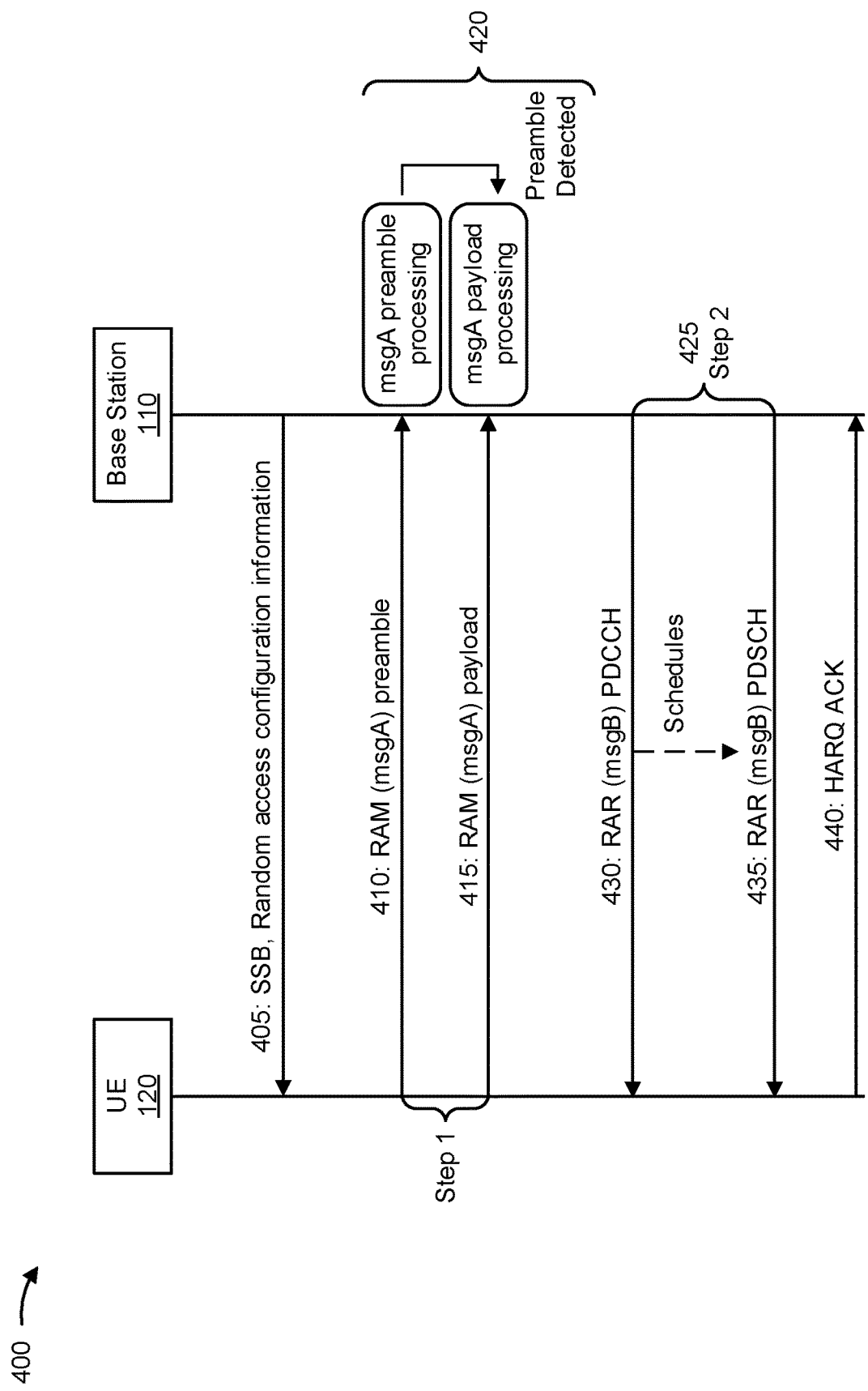
FIG. 4 is a diagram illustrating an example of a two-step random access procedure.

FIG. 4 is a diagram illustrating an example 400 of a two-step random access procedure. As shown in FIG. 4, a base station 110 and a UE 120 may communicate with one another to perform the two-step random access procedure. In some aspects, the two-step random access procedure may be performed in an NTN, such as an NTN as described above in connection with FIG. 3 (e.g., the base station 110 may be a satellite or a satellite may include the base station 110).

As shown by reference number 405, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a random access channel (RACH) procedure, such as for contention-free random access. The random access configuration information may include one or more parameters to be used in the two-step random access procedure, such as one or more parameters for transmitting a random access message (RAM) and/or receiving a random access response (RAR) to the RAM.

As shown by reference number 410, the UE 120 may transmit, and the base station 110 may receive, a RAM preamble. As shown by reference number 415, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a sequence a msgA preamble, a preamble, a physical random access channel (PRACH) preamble, or a PRACH sequence, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a physical uplink shared channel (PUSCH) transmission).

As shown by reference number 420, the base station 110 may receive the RAM preamble transmitted by the UE 120. If the base station 110 successfully receives and decodes the RAM preamble, the base station 110 may then receive and decode the RAM payload.

As shown by reference number 425, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure, the RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 430, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR For example, the PDCCH communication may indicate a resource allocation (e.g., in downlink control information (DCI)) for the PDSCH communication.

As shown by reference number 435, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 440, if the UE 120 successfully receives the RAR, the UE 120 may transmit a hybrid automatic repeat request (HARQ) acknowledgement (ACK).

As indicated above, FIG. 4 is provided as an example. Other examples may differ from what is described with regard to FIG. 4.

Figure 5:
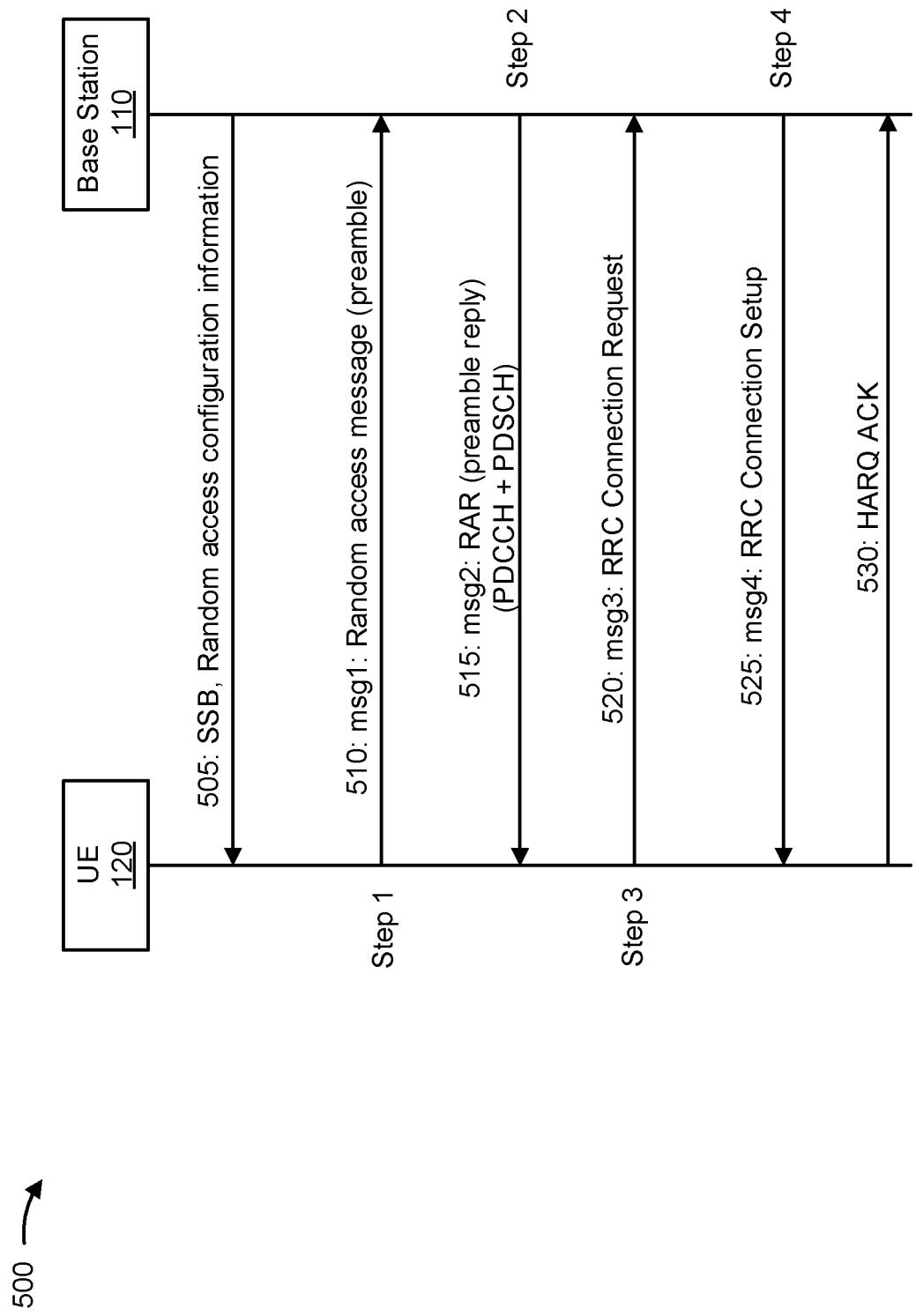
FIG. 5 is a diagram illustrating an example of a four-step random access procedure.

FIG. 5 is a diagram illustrating an example 500 of a four-step random access procedure. As shown in FIG. 5, a base station 110 and a UE 120 may communicate with one another to perform the four-step random access procedure. In some aspects, the four-step random access procedure may be performed in an NTN, such as an NTN as described above in connection with FIG. 3 (e.g., the base station 110 may be a satellite or a satellite may include the base station 110).

As shown by reference number 505, the base station 110 may transmit, and the UE 120 may receive, one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a RAM and/or one or more parameters for receiving an RAR.

As shown by reference number 510, the UE 120 may transmit a RAM, which may include a preamble (sometimes referred to as a sequence, random access preamble, a PRACH preamble, a PRACH sequence, or a RAM preamble). The message that includes the preamble may be referred to as a message 1, msg1, MSG1, a first message, or an initial message in a four-step random access procedure. The random access message may include a random access preamble identifier.

As shown by reference number 515, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also, as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 520, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request).

As shown by reference number 525, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 530, if the UE 120 successfully receives the RRC connection setup message, the UE 120 may transmit a HARQ ACK.

As indicated above, FIG. 5 is provided as an example. Other examples may differ from what is described with regard to FIG. 5.

As described above in connection with FIG. 3, a non-terrestrial network may refer to a wireless access network to which access is provided via an airborne base station 110 (e.g., a non-terrestrial base station 110, sometimes referred to as a non-terrestrial access point), such as a base station 110 located on an airborne vehicle or a vehicle in orbit, such as a satellite, and/or a high altitude platform station (e.g., an airborne station, such as a balloon, an aircraft, and/or an unmanned aerial vehicle), among other examples. Such vehicles are less vulnerable to natural disasters than terrestrial base stations 110 located on the ground, and thus non-terrestrial base stations 110 can provide emergency network access. Furthermore, such non-terrestrial base stations 110 may provide wider service coverage than terrestrial base stations 110. However, non-terrestrial networks present different technical challenges than terrestrial networks.

For example, due to the long distance between UEs 120 and non-terrestrial base stations 110, non-terrestrial networks are typically associated with much longer delays (e.g., longer latencies) than terrestrial networks, such as up to a 600 millisecond round trip delay. Furthermore, because some non-terrestrial base stations 110 (e.g., those located on satellites) are not stationary and may move at a high rate of speed (as compared to terrestrial base stations 110, which may be stationary), non-terrestrial networks are often subject to large Doppler shifts. Doppler shift may refer to a change in frequency or wavelength of a radio wave due to a relative movement between a transmitter of the radio wave and a receiver of the radio wave. For initial network access (e.g., for a random access procedure, such as the two-step random access procedure and/or the four-step random access procedure described above), a PRACH sequence (also referred to as a PRACH preamble or a PRACH preamble sequence) may be used to differentiate between different UEs 120, to account for timing delays, and/or to account for Doppler shifts.

A UE 120 may initiate a random access procedure by transmitting a PRACH sequence to the base station 110. In some systems (e.g., non-terrestrial networks or other networks), the UE 120 may track system timing for the network (e.g., using a global navigation satellite system (GNSS) or some other mechanism). Additionally, or alternatively, the UE 120 may estimate a propagation delay between the UE and the base station 110 (e.g., based on information for the base station 110). Using the system timing and the estimated propagation delay, the UE may determine a transmission timing for the PRACH sequence to pre-compensate for the propagation delay between the UE 120 and the base station 110. Accordingly, to transmit a PRACH sequence message in a specific slot (e.g., during resources reserved for the PRACH sequence), the UE 120 may transmit the PRACH sequence message prior to the leading slot boundary, such that, with the propagation delay between the UE 120 and the base station 110, the PRACH sequence message is received by the base station 110 at or near the beginning of the slot.

However, in some cases, the system timing tracked at the UE 120, the propagation delay estimated at the UE 120, or both may be slightly inaccurate. In some cases, such inaccuracies may cause the PRACH sequence message to arrive at the base station 110 prior to the leading slot boundary, potentially interfering with communications (e.g., uplink transmissions) performed in the previous slot (referred to herein as a negative delay scenario). In some cases, such inaccuracies may cause the PRACH sequence message to arrive at the base station 110 after a trailing slot boundary, potentially interfering with communications (e.g., uplink transmissions) performed in the next slot (referred to herein as a positive delay scenario).

Some techniques and apparatuses described herein enable an improved PRACH procedure for networks associated with long delays (e.g., longer latencies or propagation delays) and/or large Doppler shifts, such as a non-terrestrial network. In some aspects, the PRACH procedure may include a UE 120 transmitting a PRACH sequence using antenna switching (e.g., using two or more antennas of the UE 120). For example, the base station 110 may transmit, to the UE 120, an indication of PRACH formats that can be used by the UE 120 (e.g., in a system information message and/or in a random access channel configuration). The PRACH formats may include one or more PRACH formats associated with antenna switching and one or more PRACH formats that are not associated with antenna switching. For example, some PRACH formats may include one or more repetitions of the PRACH sequence. The UE 120 may be enabled to transmit a first PRACH sequence repetition (e.g., a first one or more PRACH sequence repetitions) using a first antenna of the UE 120 and a second PRACH sequence repetition (e.g., a second one or more PRACH sequence repetitions) using a second antenna of the UE 120. By using antenna switching when transmitting the PRACH sequence, the PRACH sequence message may experience a diversity gain through the use of multiple transmit antennas at the UE 120. The diversity gain may enable improved channel estimation at the base station 110. Additionally, the diversity gain may enable the base station 110 to make improved determinations to account for timing delays, and/or to account for Doppler shifts.

Some techniques and apparatuses described herein enable the UE 120 and the base station 110 to mitigate the effects of inaccuracies in the system timing and propagation delay estimates. In some aspects, the base station 110 may reserve resources for the network (e.g., a network resource reservation) that are different than the resources reserved for the UE 120 to transmit a PRACH sequence message. For example, in some aspects, the base station 110 may extend the resources reserved for the UE 120 to transmit the PRACH sequence message to account for the inaccuracies in the system timing and propagation delay estimates. The network resource reservation may include all time domain resources reserved for the UE 120 to transmit the PRACH sequence message (e.g., the PRACH sequence time domain resources), time domain resources that occur prior to the PRACH sequence time domain resources, and/or time domain resources that occur after to the PRACH sequence time domain resources. In this way, the base station 110 may account for the inaccuracies in the system timing and propagation delay estimates and reserve network resources to mitigate potential interference caused by the inaccuracies.

Figure 6:
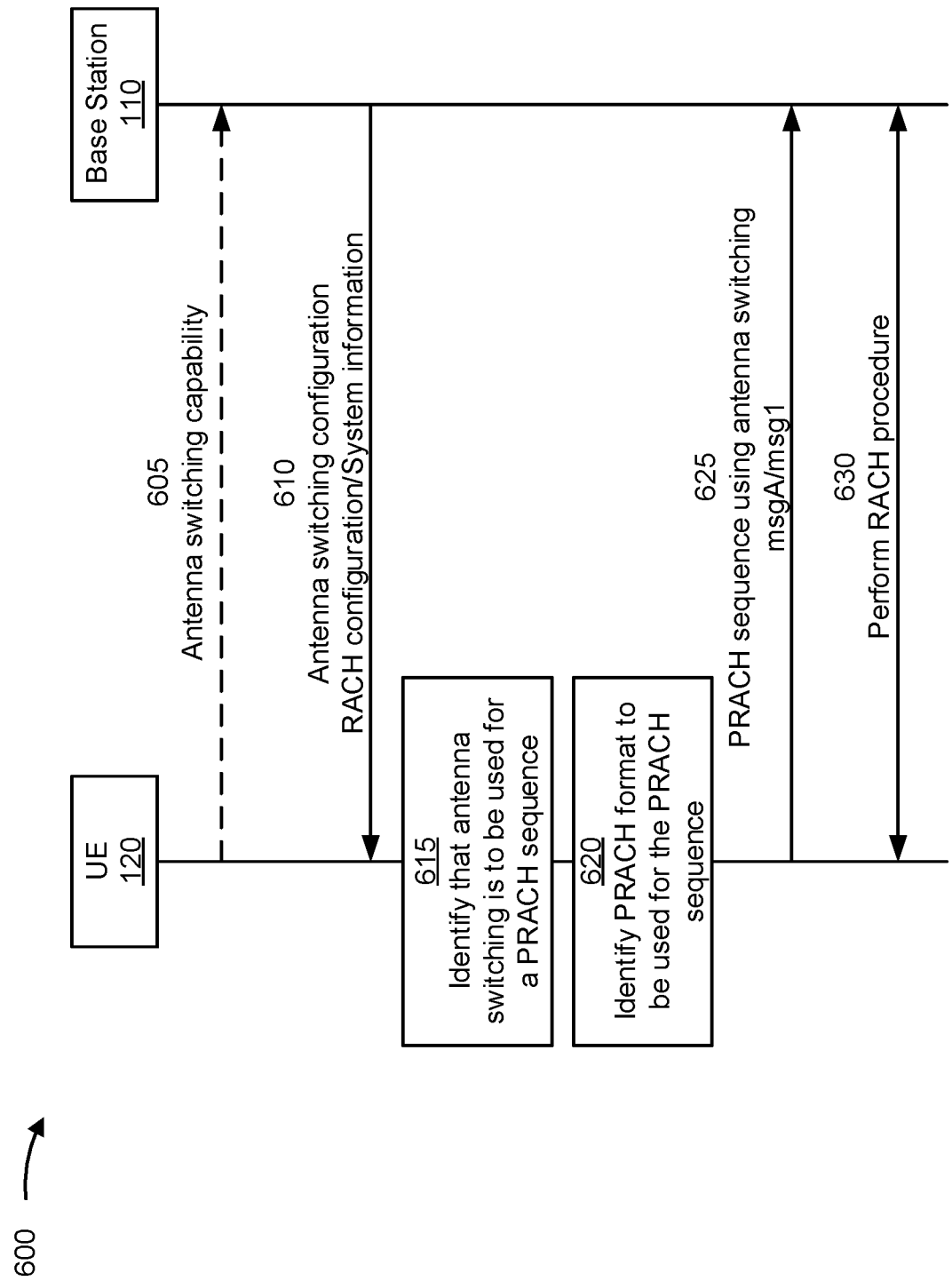
FIGS. 6-9 are diagrams illustrating examples associated with a physical random access channel (PRACH) procedure, in accordance with various aspects of the present disclosure.

FIG. 6 is a diagram illustrating an example 600 associated with a PRACH procedure, in accordance with various aspects of the present disclosure. As shown in FIG. 6, example 600 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink. In some aspects, the PRACH procedure may be performed in an NTN, such as an NTN as described above in connection with FIG. 3 (e.g., the base station 110 may be a satellite or a satellite may include the base station 110). In some aspects, the PRACH procedure may include similar steps or operations as the random access procedures described above in connection with FIGS. 4 and/or 5.

As shown by reference number 605, the UE 120 may transmit, to the base station 110, an indication of an antenna switching capability of the UE 120. In some aspects, the UE 120 may transmit the indication of the antenna switching capability of the UE 120 after successfully completing a random access procedure with the base station 110 (e.g., after a msgB of a two-step random access procedure or after a msg4 of a four-step random access procedure). In some aspects, the UE 120 may not transmit the antenna switching capability of the UE 120 prior to receiving an antenna switching configuration for the PRACH procedure (e.g., described in more detail below in connection with reference number 610).

The indication of the antenna switching capability may include an indication of whether the UE 120 supports transmit antenna switching. In some aspects, the antenna switching capability may include an indication of a number of antennas supported by the UE 120 for uplink transmit antenna switching (e.g., 2 antennas. 3 antennas, 4 antennas, 6 antennas, and/or 8 antennas), and/or an antenna switching delay associated with the UE 120. The antenna switching delay may refer to an amount of time required for the UE 120 to change or modify transmission paths from one antenna of the UE 120 to another UE 120. For example, while switching antennas, the UE 120 may be unable to transmit communications. The antenna switching delay may refer to the amount of time that the UE 120 is unable to transmit communications due to performing the antenna switching procedure.

The base station 110 may use the indication of the antenna switching capability for configuring an MCS for the UE 120. For example, a higher order MCS may be used for a UE 120 that supports antenna switching compared to a UE 120 that does not support antenna switching. Additionally, or alternatively, the base station 110 may use the indication of the antenna switching capability to determine a channel estimation technique to be used by the base station 110. As a UE 120 that supports antenna switching may transmit a PRACH sequence using different antennas (e.g., on different channels), certain channel estimation techniques may result in an inaccurate channel estimation. For example, for a UE 120 that uses antenna switching, the base station 110 may be unable to use a DMRS bundling channel estimation technique (e.g., as a DMRS that is transmitted before the antenna switching and a DMRS that is transmitted after the antenna switching may experience different channels and it may be difficult to coherently combine the two DMRSs to estimate the channel). Therefore, the base station 110 may improve an uplink channel estimation by avoiding using channel estimation techniques that result in an inaccurate channel estimation when antenna switching is used by the UE 120.

In some aspects, the base station 110 may use the indication of the antenna switching capability for determining a timing for detecting and/or decoding an uplink transmission (e.g., a PRACH sequence) from the UE 120. For example, the base station 110 may identify that the UE 120 supports and/or is to use antenna switching for a PRACH sequence message. The base station 110 may determine a timing or location of a fast Fourier transform (FFT) window that is to be used to decode the PRACH sequence message (e.g., to avoid placing the FFT window during a time in which the UE 120 is not transmitting due to performing an antenna switch).

As shown by reference number 610, the base station 110 may transmit, to the UE 120, an antenna switching configuration. In some aspects, the antenna switching configuration may be included in a system information message associated with the PRACH procedure. For example, the base station 110 may include the antenna switching configuration in system information (e.g., in one or more SIBs) transmitted before an initial message in a random access channel procedure (e.g., before a msgA or a msg1 of a random access channel procedure). In some aspects, the antenna switching configuration may be included in a random access channel configuration. In some aspects, the random access channel configuration (e.g., and/or the antenna switching configuration) may be based at least in part on the indication of the antenna switching capability of the UE 120.

The antenna switching configuration may indicate one or more PRACH formats associated with antenna switching. The antenna switching configuration may indicate that the UE 120 is to perform antenna switching when transmitting a PRACH sequence using the one or more PRACH formats. In some aspects, the antenna switching configuration may indicate one or more PRACH formats that are not associated with antenna switching.

A PRACH format may indicate a set of PRACH format parameters to be used to determine the PRACH sequence and/or transmission properties for the PRACH sequence. A PRACH format parameter (sometimes referred to as a PRACH parameter) may refer to a parameter that defines a set of permitted PRACH sequences for a random access procedure (e.g., a set of permitted sequences of a PRACH preamble transmitted by the UE 120 in a random access message, such as message 1 (MSG 1) of a RACH procedure) and/or a transmission property for the PRACH sequence. The PRACH format parameter may include a PRACH sequence length, a sub-carrier spacing to be used for transmission of the PRACH sequence, a cyclic prefix length for the PRACH sequence, a number of transmission repetitions for the PRACH sequence, and/or a guard period for transmission of the PRACH sequence, among other examples.

In some aspects, the one or more PRACH formats associated with antenna switching may include PRACH formats that include one or more repetitions (e.g., to enable the UE 120 to transmit at least one repetition of the PRACH sequence using a first antenna and at least one repetition of the PRACH sequence using a second antenna). The one or more PRACH formats may include a PRACH format 0, 1, 2, 3, A1, A2, A3, B1, B2, B3, B4, and/or C2, among other examples (e.g., as defined, or otherwise fixed, by a wireless communication standard, such as a 3GPP Specification).

In some aspects, the antenna switching configuration may indicate that a PRACH format is to be used with antenna switching based at least in part on the indication of the PRACH format. For example, the PRACH format may be X-a, where X indicates the PRACH format (e.g., PRACH format X) and a indicates that the UE 120 is to use antenna switching with the PRACH format.

In some aspects, the PRACH format and the indication that the PRACH format is to be used with antenna switching by the UE 120 are indicated by the base station separately. For example, the antenna switching configuration may indicate the PRACH format in a first bit (e.g., a first one or more bits) and may indicate whether the PRACH format is to be used with antenna switching by the UE 120 in a second bit (e.g., a second one or more bits).

In some aspects, the base station 110 may indicate whether the PRACH format is to be used with antenna switching by the UE 120 based at least in part on a random access channel occasion associated with the PRACH sequence. For example, the base station 110 may configure the UE 120 with one or more random access channel occasions in which the UE 120 is to perform antenna switching when transmitting a PRACH sequence (e.g., antenna switching random access channel occasions) and/or one or more random access channel occasions in which the UE 120 is not to perform antenna switching when transmitting a PRACH sequence (e.g., normal random access channel occasions or non-antenna switching random access channel occasions). The base station 110 may indicate that the UE 120 is to perform antenna switching when transmitting a PRACH sequence (e.g., using the PRACH format) based at least in part on the random access channel occasion that is to be used for transmitting the PRACH sequence. For example, if the UE 120 is to perform antenna switching, then the UE 120 may transmit the PRACH sequence in an antenna switching random access channel occasion. If the UE 120 is not to perform antenna switching, then the UE 120 may transmit the PRACH sequence in a normal random access channel occasion.

As shown by reference number 615, the UE 120 may identify and/or determine that antenna switching is to be used for a PRACH sequence (e.g., when transmitting the PRACH sequence). For example, the UE 120 may identify that antenna switching is to be used for a PRACH sequence based at least in part on the antenna switching configuration (e.g., based at least in part on a PRACH format or an indication from the base station 110). In some aspects, the UE 120 may identify that antenna switching is to be used for a PRACH sequence based at least in part on the antenna switching capability of the UE 120. For example, if the UE 120 supports antenna switching, then the UE 120 may select a PRACH format and/or a random access channel occasion that is associated with antenna switching. If the UE 120 does not support antenna switching, then the UE 120 may select a PRACH format and/or a random access channel occasion that is not associated with antenna switching.

As shown by reference number 620, the UE 120 may identify the PRACH format to be used for transmitting the PRACH sequence. As described above, the PRACH format may be indicated in a random access channel configuration (e.g., in the antenna switching configuration). In some aspects, the UE 120 may select the PRACH format from the one or more PRACH formats that are associated with antenna switching (e.g., that are indicated and/or configured by the base station 110, as described above). Example PRACH formats associated with antenna switching are described in more detail below in connection with FIG. 7.

As shown by reference number 625, the UE 120 may transmit, to the base station 110, the PRACH sequence using antenna switching. For example, the UE 120 may transmit one or more repetitions of the PRACH sequence using a first antenna of the UE 120. At an antenna switch time (e.g., a point in time during the PRACH sequence), the UE 120 may perform an antenna switch procedure to switch an active transmit antenna of the UE 120 from the first antenna to a second antenna. The UE 120 may transmit one or more repetitions of the PRACH sequence using the second antenna of the UE 120. The UE 120 may switch to additional transmit antennas (e.g., a third antenna and/or a fourth antenna) in a similar manner as described above. As described above, the PRACH sequence may be a msgA or a msg1 of a random access channel procedure.

The antenna switch time may be a point in time during the overall transmission of the PRACH sequence. The overall transmission of the PRACH sequence includes one or more repetitions of the PRACH sequence and a duration of a cyclic prefix associated with the PRACH sequence. In some aspects, the antenna switch time may be a halfway point or a middle of the overall transmission of the PRACH sequence. In some aspects, the antenna switch time may be based at least in part on a number of antennas to be used by the UE 120. For example, if the UE 120 is to use two antennas, then the antenna switch time may be a halfway point or a middle of the overall transmission of the PRACH sequence. If the UE 120 is to use three antennas, then there may be a first antenna switch time after a first third of the overall transmission of the PRACH sequence and a second antenna switch time after a second third of the overall transmission of the PRACH sequence.

In some aspects, the antenna switch time may be a point in during a last repetition to be transmitted using a first antenna of the UE 120. In other words, the UE 120 may perform the antenna switch procedure (e.g., at the antenna switch time) prior to a start of a first repetition that is to be transmitted using a second antenna of the UE 120. In this way, the UE 120 may ensure that the transmission using the second antenna includes circular signal structure, such that the first N data samples and last N data samples of the transmission are identical (e.g., similar to a cyclic prefix). For example, the cyclic prefix of the PRACH sequence may be obtained by prepending a copy of the last N data samples from the end of the PRACH sequence to the beginning of the PRACH sequence. In this way, the symbol structure may result in a circular signal structure, such that the first N data samples and last N data samples of the symbol are identical. A cyclic prefix may be used for a communication to avoid inter-symbol interference (ISI) between adjacent symbols in multipath channel environments.

By performing the antenna switch procedure (e.g., at the antenna switch time) prior to a start of a first repetition that is to be transmitted using a second antenna of the UE 120, the UE 120 may ensure that some data symbols of the last repetition to be transmitted using a first antenna of the UE 120 are actually transmitted using the second antenna. As the repetitions are identical copies, the data symbols of the last repetition to be transmitted using a first antenna of the UE 120 are identical to the corresponding data symbols of the first repetition that is to be transmitted using a second antenna. As a result, the data symbols of the first repetition that are transmitted using the second antenna may create a virtual cyclic prefix for the transmission using the second antenna. Therefore, the transmission using the second antenna can include a circular signal structure, and the benefits of the cyclic prefix can be achieved for the transmission using the second antenna.

Moreover, as different UEs 120 transmitting to the base station 110 may have different propagation delays (e.g., causing transmission to arrive at the base station 110 at different times as described in more detail below in connection with FIGS. 8 and/or 9), the base station 110 may still be enabled to receive a full sequence correlation using the cyclic prefix of the PRACH sequence. For example, the base station 110 may place or locate an FFT window of the PRACH sequence within the cyclic prefix (e.g., and ending at or near the antenna switch time) to enable the base station 110 to receive the PRACH sequence and receive other transmissions that may arrive at slightly different times, using the built-in buffer of the cyclic prefix. Additionally, the amount of time required for the UE 120 to perform the antenna switch procedure is typically small (e.g., less than 10 microseconds). This amount of time can be absorbed in the part of the PRACH sequence repetition that occurs after antenna switch procedure has been performed (e.g., in the virtual cyclic prefix). As a result, communication performance between the UE 120 and the base station 110 is not degraded due to the UE 120 performing the antenna switch procedure during the PRACH sequence repetition.

The UE 120 may identify the antenna switch time based at least in part on a configuration (e.g., from the base station 110). For example, the UE 120 may receive, from the base station, an indication of the antenna switch time (e.g., that is associated with or based at least in part on a PRACH format). In some aspects, the UE 120 may identify the antenna switch time based at least in part on a stored configuration or a pre-configuration. For example, the antenna switch time may be defined or otherwise fixed (e.g., for a PRACH format) by a wireless communication standard, such as a 3GPP Specification.

As shown by reference number 630, the UE 120 and the base station 110 may communicate to perform and/or complete a random access channel procedure based at least in part on the UE 120 transmitting the PRACH sequence. For example, the UE 120 and the base station 110 may communicate to perform and/or complete a two-step random access procedure (e.g., as described above in connection with FIG. 4) and/or a four-step random access channel procedure (e.g., as described above in connection with FIG. 5). By using antenna switching when transmitting the PRACH sequence, the PRACH sequence message may experience a diversity gain through the use of multiple transmit antennas at the UE 120. The diversity gain may enable improved channel estimation at the base station 110 during the random access channel procedure. Additionally, the diversity gain may enable the base station 110 to make improved determinations to account for timing delays and/or to account for Doppler shifts during the random access channel procedure.

As indicated above, FIG. 6 is provided as an example. Other examples may differ from what is described with respect to FIG. 6.

Figure 7:
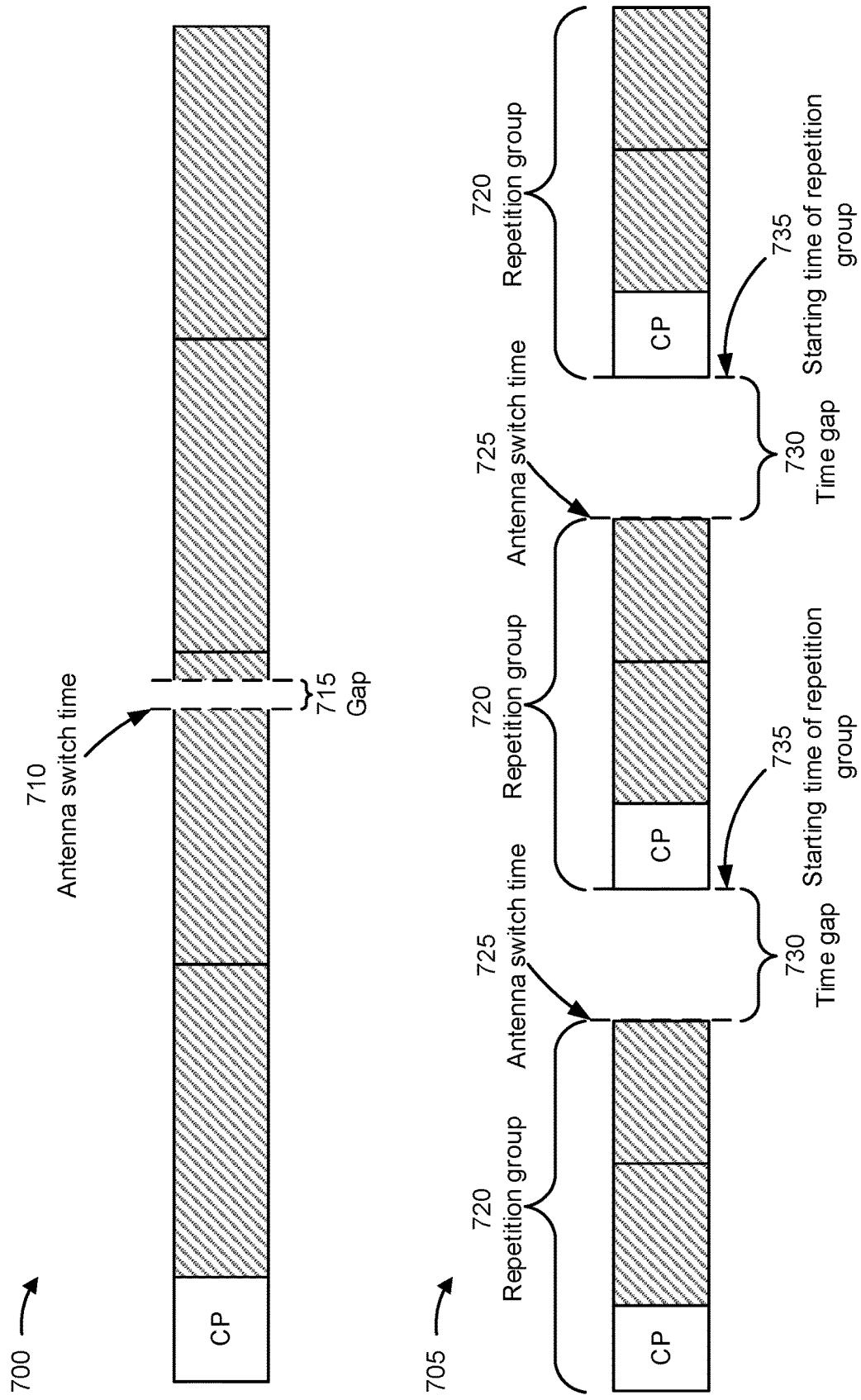

FIG. 7 is a diagram illustrating examples 700 and 705 associated with a PRACH procedure, in accordance with various aspects of the present disclosure. As shown in FIG. 7, examples 700 and 705 illustrate example PRACH formats using antenna switching by a UE 120 when transmitting a PRACH sequence (e.g., as described above in connection with FIG. 6).

As shown in FIG. 7, and example 700, a first PRACH format with antenna switching is depicted. The first PRACH format may be a PRACH format 2 (e.g., as defined by wireless communication standards). The PRACH format 2 may include a cyclic prefix (CP) and four PRACH sequence repetitions. As shown by reference number 710, the UE 120 may identify an antenna switch time associated with the PRACH format 2. As described above in connection with FIG. 6, the antenna switch time may be based at least in part upon an overall duration of the PRACH sequence (e.g., that includes the duration of the cyclic prefix and the duration of the four PRACH sequence repetitions). The antenna switch time may be defined according to the end of the second PRACH sequence, the start of the second PRACH sequence, and/or the start of the PRACH sequence transmission (e.g., the start of the cyclic prefix or the start of the first PRACH repetition), among other examples.

In some aspects, an amount of time between the antenna switch time and the end of the PRACH sequence repetition that includes the antenna switch time (e.g., the second PRACH sequence repetition as shown in example 700) may be based at least in part on a duration of the cyclic prefix. For example, the amount of time between the antenna switch time and the end of the PRACH sequence repetition may be a factor (e.g., between 0 and 1) of the duration of the cyclic prefix (e.g., may be 0.5 times the duration of the cyclic prefix, 0.25 times the duration of the cyclic prefix, and/or 0.75 times the duration of the cyclic prefix). As discussed above, the antenna switch time may be configured (e.g., by a base station 110) and/or defined, or otherwise fixed, by a wireless communication standard, such as a 3GPP Specification.

When transmitting the PRACH sequence, the UE 120 may transmit the cyclic prefix, the first PRACH sequence repetition, and the second PRACH sequence repetition up until the antenna switch time. At the antenna switch time, the UE 120 may perform an antenna switch procedure to switch an active transmit antenna of the UE 120 from the first antenna to a second antenna. As shown by reference number 715, while performing the antenna switch procedure, there may be a gap in the transmission by the UE 120. The UE 120 may transmit the portion of the second PRACH sequence after the end of the gap using the second antenna. Additionally, the UE 120 may transmit the third PRACH sequence and the fourth PRACH sequence using the second antenna. This enables the transmission using the second antenna to maintain a circular signal structure (e.g., as described above in connection with FIG. 6). Additionally, the gap shown by reference number 715 can be absorbed in the duration of the cyclic prefix, enabling the base station 110 to obtain a full sequence repetition for each repetition. For example, the base station 110 can obtain data samples from the cyclic prefix that correspond to the data samples that were not transmitted during the gap.

As shown in FIG. 7, and example 705, a second PRACH format with antenna switching is depicted. As shown in example 705, and by reference number 720, the second PRACH format may include one or more repetition groups. A repetition group may include a cyclic prefix and one or more PRACH sequence repetitions (e.g., the example 705 depicts repetition groups that include two PRACH sequence repetitions each). As shown by reference number 725, one or more antenna switch times may be defined or configured for the second PRACH format. An antenna switch time may be set at the end of a repetition group. As shown by reference number 730, the second PRACH format may include a time gap between each repetition group. The time gap may be used by the UE 120 to perform an antenna switch procedure (e.g., the UE 120 may perform the antenna switch procedure during the time gap). In some aspects, the amount of time associated with each time gap may be indicated or configured with the PRACH format (e.g., by a base station 110 and/or defined by a wireless communication standard). In some aspects, as shown by reference number 735, a starting time for each repetition group (e.g., in addition to, or rather than, the amount of time associated with each time gap) may be indicated or configured with the PRACH format (e.g., by a base station 110 and/or defined by a wireless communication standard).

When transmitting the PRACH sequence, the UE 120 may transmit the first repetition group using a first antenna of the UE 120. At a first antenna switch time (e.g., at the end of the first repetition group), the UE 120 may perform an antenna switch procedure to switch an active transmit antenna of the UE 120 from the first antenna to a second antenna. After the amount of time associated with the time gap, or at the starting time of the second repetition group, the UE 120 may transmit the second repetition group using the second antenna. At a second antenna switch time (e.g., at the end of the second repetition group), the UE 120 may perform an antenna switch procedure to switch an active transmit antenna of the UE 120 from the second antenna to a third antenna (or back to the first antenna). After the amount of time associated with the time gap, or at the starting time of the third repetition group, the UE 120 may transmit the third repetition group using the third antenna (or the first antenna). By including the time gaps in the PRACH format, gaps associated with the antenna switch procedure (e.g., where the UE 120 is unable to transmit) that are large (e.g., that are non-negligible compared to the duration of the cyclic prefix) can be absorbed by the time gaps. Additionally, the second PRACH format conserves network resources and/or time that would have otherwise been used to detect a random access failure due to performing the antenna switch procedure during a PRACH sequence repetition.

As indicated above, FIG. 7 is provided as an example. Other examples may differ from what is described with respect to FIG. 7.

Figure 8:
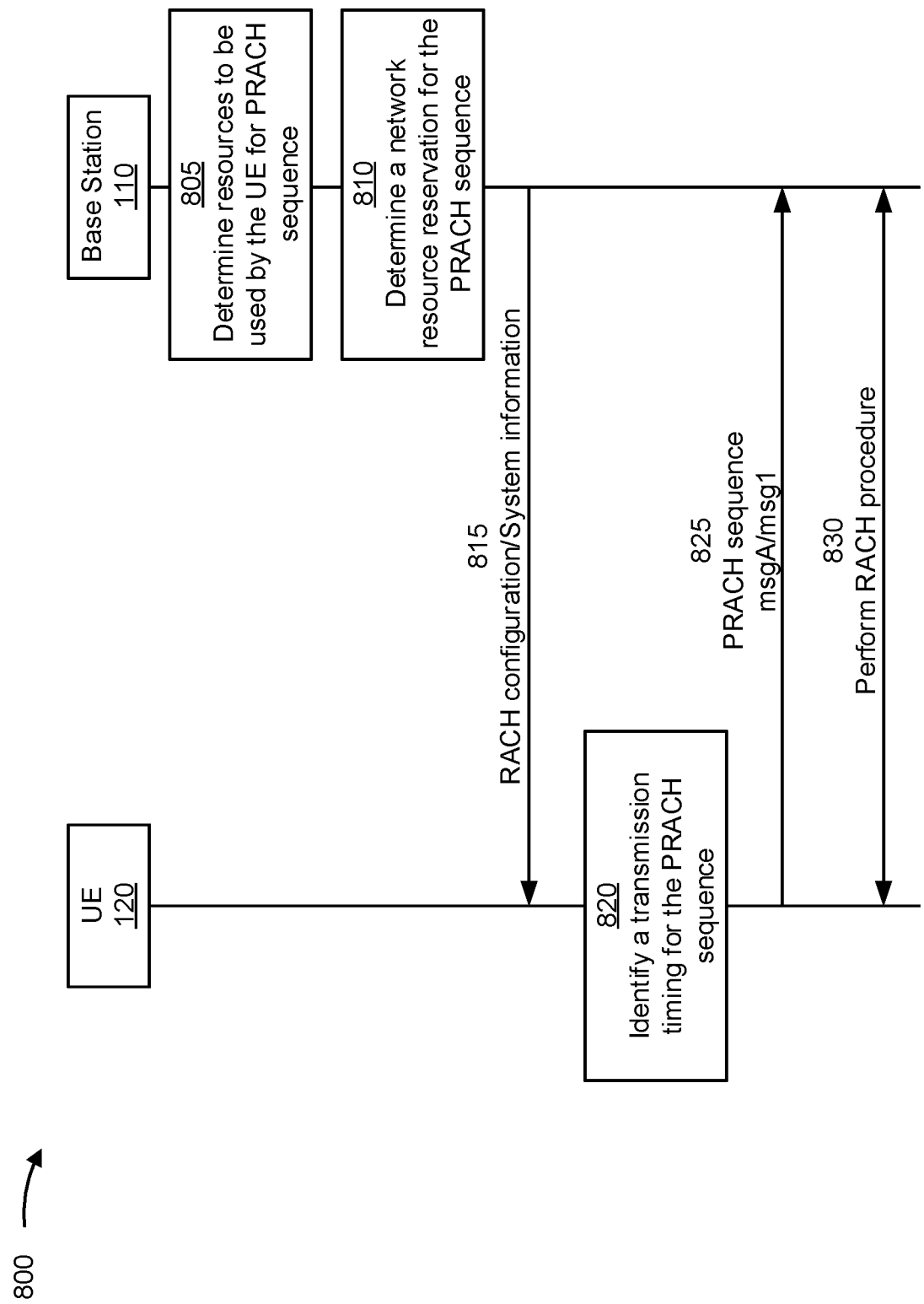

FIG. 8 is a diagram illustrating an example 800 associated with a PRACH procedure, in accordance with various aspects of the present disclosure. As shown in FIG. 8, example 800 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink. In some aspects, the PRACH procedure may be performed in an NTN, such as an NTN as described above in connection with FIG. 3 (e.g., the base station 110 may be a satellite or a satellite may include the base station 110). In some aspects, the PRACH procedure may include similar steps or operations as the random access procedures described above in connection with FIGS. 4 and/or 5.

As shown by reference number 805, the base station 110 may determine resources to be used by (or that are available for) the UE 120 to transmit a PRACH sequence (e.g., a PRACH preamble). For example, the resources may be a random access channel occasion, a transmission time interval (TTI), and/or a slot, among other examples. For example, the base station 110 may determine a set of random access channel occasions (e.g., symbols, slots, and/or frequency resources) that are available for the UE 120 to transmit a PRACH sequence (e.g., to initiate a random access channel procedure with the base station 110).

As shown by reference number 810, the base station 110 may determine a network resource reservation to be used by the base station 110 to receive the PRACH sequence from the UE 120. The network resource reservation may include the resources to be used by (or that are available for) the UE 120 to transmit a PRACH sequence and additional resources to account for inaccuracies in a timing of the UE 120. For example, as described above, the UE 120 may estimate a propagation delay between the UE 120 and the base station 110 for the PRACH sequence transmission and may determine a transmission timing (e.g., a transmission time) to account for the estimated propagation delay (e.g., using a GNSS). However, in some cases, the estimated propagation delay may be inaccurate, causing the PRACH sequence to arrive at the base station 110 before a slot boundary (e.g., potentially interfering with other transmissions received by the base station 110 in the previous slot) or after a slot boundary (e.g., potentially interfering with other transmissions received by the base station 110 in the next slot).

To account for potential inaccuracies in the propagation delay estimation, the base station 110 may reserve time domain resources in the previous slot (e.g., that occur prior to the time domain resources to be used by (or that are available for) the UE 120 to transmit a PRACH sequence), in the next slot (e.g., that occur after the time domain resources to be used by (or that are available for) the UE 120 to transmit a PRACH sequence), or both. In this way, if a PRACH sequence is transmitted by the UE 120 with an inaccurate propagation delay estimate (e.g., that arrives at the base station 110 in a previous slot or a next slot than the intended slot), the base station 110 may receive the PRACH sequence using the network resource reservation that extends into the previous slot and/or the next slot. This may reduce a risk of interference caused by the PRACH sequence that is transmitted by the UE 120 with an inaccurate propagation delay estimate.

The base station 110 may determine an amount of resources to reserve for the base station 110 (e.g., outside of the resources to be used by (or that are available for) the UE 120 to transmit a PRACH sequence) based at least in part on a timing accuracy of the UE 120. For example, a timing accuracy of the UE 120 may be determined by the base station 110 (e.g., based on prior communications with the UE 120) and/or may be configured at the base station 110. The amount of resources to reserve for the base station 110 (e.g., outside of the resources to be used by (or that are available for) the UE 120 to transmit a PRACH sequence) may account for the timing accuracy of the UE 120. In some aspects, the amount of resources to reserve for the base station 110 (e.g., outside of the resources to be used by (or that are available for) the UE 120 to transmit a PRACH sequence) may be based at least in part on a cyclic prefix duration of the PRACH sequence. For example, the amount of resources to reserve for the base station 110 (e.g., outside of the resources to be used by (or that are available for) the UE 120 to transmit a PRACH sequence) may be a portion or a factor of the cyclic prefix duration. The network resource reservation is depicted and described in more detail below in connection with FIG. 9.

In some aspects, the base station 110 may determine a timing offset value to be used by the UE 120. The timing offset value may be an amount of time that the UE 120 is to delay a transmission of the PRACH sequence to account for potential inaccuracies in the propagation delay estimation. In some aspects, the timing offset value may be determined by the UE 120 (e.g., autonomously without signaling and/or configuration from the base station 110). In some aspects, the timing offset value may be included in broadcast signaling, such as a system information message (e.g., a SIB, such as SIB1). By using broadcast signaling, the base station 110 *a* may indicate the timing offset value as a system-wide parameter. In some aspects, the base station 110 may update the timing offset value and may retransmit the updated timing offset value in a system information message. Additionally, or alternatively, the base station 110 may determine the timing offset value based on a timing accuracy of one or more UEs 120.

In some aspects, the timing offset value may be pre-configured at the UE 120. In some aspects, all UEs 120 in the wireless communications system may be pre-configured with a same timing offset value. In some aspects, different UEs 120 may have different timing offset values. For example, the timing offset value for a specific UE 120 may be configured based on a timing accuracy of the UE 120.

In some aspects, the timing offset value may be based at least in part on the cyclic prefix duration of the PRACH sequence. For example, the timing offset value may be a portion or a factor of the cyclic prefix duration. In some aspects, the timing offset value may be half of the cyclic prefix duration and/or a quarter of the cyclic prefix duration, among other examples.

As shown by reference number 815, the base station 110 may transmit, to the UE 120, a random access channel (RACH) configuration and/or a system information message. The base station 110 may indicate, to the UE 120, the resources to be used by (or that are available for) the UE 120 to transmit a PRACH sequence. For example, the base station 110 may configure one or more random access channel occasions or slots that are available for the UE 120 to transmit a PRACH sequence. In some aspects, the base station 110 may not indicate the network resource reservation (e.g., the extended resources reserved by the base station 110). For example, the base station 110 may reserve the extended resources for the base station 110 in a transparent manner to the UE 120. In some aspects, the base station 110 may indicate the network resource reservation (e.g., the extended resources reserved by the base station 110). In some aspects, the base station 110 may indicate the timing offset value to be used by the base station 110 for determining a transmission timing for the PRACH sequence.

As shown by reference number 820, the UE 120 may identify and/or determine a transmission timing for a PRACH sequence. For example, the UE 120 may identify and/or select a resource allocation (e.g., a random access channel occasion or a slot) to be used for transmitting the PRACH sequence. The UE 120 may be equipped with a GNSS and may estimate a slot boundary of the resource allocation using a system timing obtained from the GNSS. Additionally, the UE 120 may estimate a propagation delay between the UE 120 and the base station 110. For example, because the UE 120 may not yet be connected to the base station 110, the UE 120 may not have a timing advance (TA) value to apply to compensate for the actual propagation delay (e.g., based on closed-loop timing control between the base station 110 and the UE 120). Instead, the UE 120 may implement open-loop timing control using one or more techniques to estimate the propagation delay (e.g., without feedback from the base station 110). In some aspects, the UE 120 may use satellite ephemeris information from the base station 110 (e.g., a satellite in an NTN) to estimate the propagation delay. The UE 120 may use the estimated propagation delay to determine an initial transmission timing for the PRACH sequence. For example, the UE 120 may subtract the estimated propagation delay from the timing of a leading boundary of the slot to obtain the initial transmission timing.

If the estimated propagation delay is accurate (e.g., a zero delay scenario), the base station 110 may receive the PRACH sequence at the slot boundary (e.g., in the intended resource allocation). However, if the estimated propagation delay, the slot boundary determined from the system timing, or both are inaccurate, and the UE 120 transmits the RACH preamble at that time, the base station 110 may receive the PRACH sequence either before or after the slot boundary. However, as the base station 110 may have reserved extended resources, as explained above, the base station 110 may be enabled to receive the PRACH sequence either before or after the slot boundary.

In some aspects, the base station 110 may further determine the transmission timing based at least in part on the timing offset value. For example, as described above, the UE 120 may determine a first transmission timing by subtracting the estimated propagation delay from the timing of a leading boundary of the slot. The UE 120 may delay or back off the first transmission timing by the timing offset value. For example, the UE 120 may add the timing offset value to the first transmission timing to obtain a second transmission timing. Therefore, the UE 120 may determine the transmission timing for the PRACH sequence by determining a first timing value corresponding to a slot boundary, subtracting from the first timing value the propagation delay (e.g., advancing timing by the estimated propagation delay value), and adding the timing offset (e.g., backing off by the timing offset value).

In some aspects, the UE 120 (and/or the base station 110) may modify the PRACH format of the PRACH sequence prior to transmitting the PRACH sequence. The UE 120 may modify a cyclic prefix duration of the PRACH format. For example, the UE 120 may identify a first cyclic prefix duration based at least in part on a PRACH format of the PRACH sequence. The UE 120 may modify (e.g., reduce) the first cyclic prefix duration by a factor to obtain a second cyclic prefix duration. For example, the second cyclic prefix duration may be half of the first cyclic prefix duration and/or a quarter of the first cyclic prefix duration, among other examples. The duration of the second cyclic prefix duration may be signaled by the network to the UE, or determined by the UE 120 (e.g., autonomously without signaling or configuration by the base station 110) based at least in part on the error in estimating the propagation delay. The timing offset value may be based at least in part on the modified cyclic prefix duration (e.g., the second cyclic prefix duration). For example, the timing offset value may be a portion or a factor of the modified cyclic prefix duration (e.g., the second cyclic prefix duration). By modifying the cyclic prefix duration, the base station 110 is enabled to reduce the network resource reservation for the PRACH sequence, thereby conserving network resources. For example, as the timing offset value may be based at least in part on the modified (e.g., reduced) cyclic prefix duration, the base station 110 may be enabled to reserve fewer resources as an amount of time that the transmission of the PRACH sequence may be delayed by the UE 120 is reduced. The UE 120 may transmit the PRACH sequence using the modified (e.g., reduced) cyclic prefix duration, as described in more detail below.

As shown by reference number 825, the UE 120 may transmit, at the transmission timing determined as described above, the PRACH sequence to the base station 110. As described above, the PRACH sequence may be, or may be included in, a msgA or a msg1 of a random access channel procedure. The base station 110 may receive the PRACH sequence using the network resource reservation (e.g., the extended resources reserved by the base station 110).

As shown by reference number 830, the UE 120 and the base station 110 may communicate to perform and/or complete a random access channel procedure based at least in part on the UE 120 transmitting the PRACH sequence. For example, the UE 120 and the base station 110 may communicate to perform and/or complete a two-step random access procedure (e.g., as described above in connection with FIG. 4) and/or a four-step random access channel procedure (e.g., as described above in connection with FIG. 5). As a result, the base station 110 is enabled to account for potential inaccuracies in the propagation delay estimation, the system timing estimation, or both, at the UE 120 by extending the resources reserved for receiving PRACH sequence. Additionally, or alternatively, by backing off the transmission timing according to the timing offset value, the UE 120 may ensure that the PRACH sequence is received at the base station 110 at or after the slot boundary, avoiding potential interference to communications in the previous slot. Additionally, by extending the PRACH sequence time domain resources reservation for the network, the base station 110 may ensure that the PRACH sequence does not interfere with communication in a subsequent slot (or the previous slot).

As indicated above, FIG. 8 is provided as an example. Other examples may differ from what is described with respect to FIG. 8.

Figure 9:
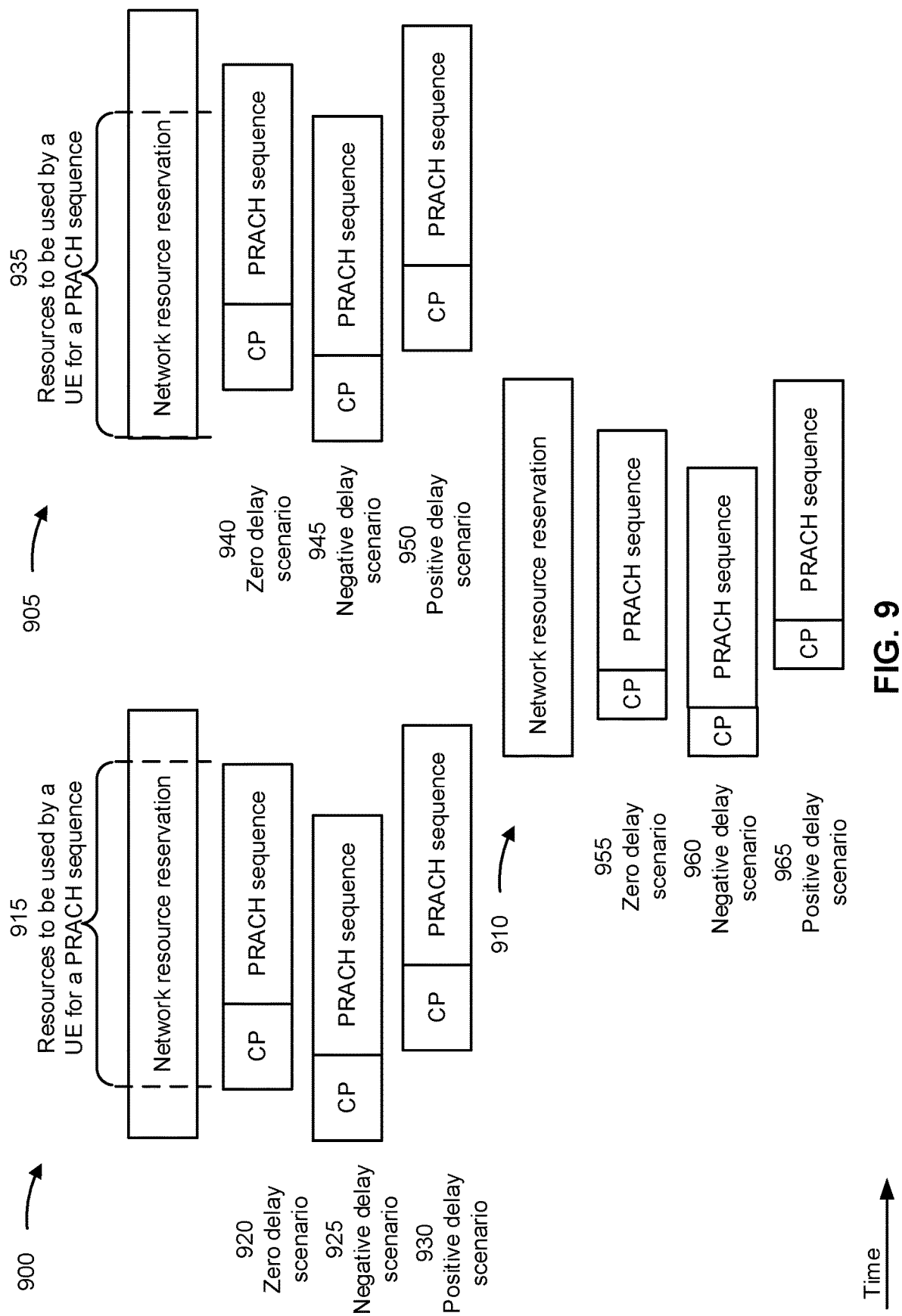

FIG. 9 is a diagram illustrating examples 900, 905, and 910 associated with a PRACH procedure, in accordance with various aspects of the present disclosure. As shown in FIG. 9, examples 900, 905, and 910 illustrate example time domain resource reservations to account for potential inaccuracies in the propagation delay estimation, the system timing estimation, or both, at a UE 120 (e.g., as described above in connection with FIG. 8).

As shown in FIG. 9, and by example 900, a base station 110 may determine a network resource reservation for a PRACH sequence. As shown by reference number 915, the network resource reservation may include time domain resource to be used by (or available to) a UE 120 for a PRACH preamble (e.g., the PRACH sequence resource reservation). As shown in example 900, the network resource reservation may include time domain resources that occur prior to the PRACH sequence resource reservation (e.g., to account for negative delay scenarios) and time domain resources that occur after the PRACH sequence resource reservation (e.g., to account for positive delay scenarios). For example, the network resource reservation may include time domain resources in a previous slot to the slot reserved for the PRACH sequence and time domain resources in a next slot after the slot reserved for the PRACH sequence. The amount of resources reserved outside of the PRACH sequence resource reservation may be based at least in part on a timing accuracy of the UE 120, a maximum possible timing inaccuracy of the UE 120, and/or a cyclic prefix duration of the PRACH sequence, among other examples.

This enables the base station 110 to account for negative delay scenarios and positive delay scenarios (e.g., inaccuracies in the propagation delay estimation, the system timing estimation, or both, at a UE 120). Example 900 depicts a scenario in which the UE 120 may not use a timing offset value when determining a transmission timing for the PRACH sequence (e.g., in which the UE 120 does not back off or delay the transmission of the PRACH sequence).

As shown by reference number 920, if the estimated propagation delay by the UE 120 is accurate (e.g., a zero delay scenario), the base station 110 may receive the PRACH sequence at the slot boundary (e.g., in the intended resource allocation or the reserved slot). As shown by reference number 925, if the estimated propagation delay by the UE 120 is not accurate, the PRACH sequence may arrive at the base station 110 prior to the leading slot boundary of the intended resource allocation or the reserved slot (e.g., a negative delay scenario). However, as the network resource reservation includes time domain resources in the slot prior to the reserved slot for the PRACH sequence, the base station 110 may successfully receive the PRACH sequence (e.g., using the network resource reservation) while also avoiding potential interference with communications received during the slot prior to the reserved slot for the PRACH sequence. As shown by reference number 930, if the estimated propagation delay by the UE 120 is not accurate, the PRACH sequence may arrive at the base station 110 after the trailing slot boundary of the intended resource allocation or the reserved slot (e.g., a positive delay scenario). However, as the network resource reservation includes time domain resources in the slot after the reserved slot for the PRACH sequence, the base station 110 may successfully receive the PRACH sequence (e.g., using the network resource reservation) while also avoiding potential interference with communications received during the slot after the reserved slot for the PRACH sequence.

As shown in FIG. 9, and example 905, a base station 110 may determine a network resource reservation for a PRACH sequence. As shown by reference number 935, the network resource reservation may include time domain resource to be used by (or available to) a UE 120 for a PRACH preamble (e.g., the PRACH sequence resource reservation). As shown in example 905, the network resource reservation may only include the PRACH sequence resource reservation and time domain resources that occur after the PRACH sequence resource reservation (e.g., and not time domain resources that occur prior to the PRACH sequence resource reservation). This enables the base station 110 to reserve resource in only one additional slot (e.g., rather than two). To account for negative delay scenarios, the base station 110 may configure the UE 120 to use a timing offset value when determining a transmission timing for the PRACH sequence (e.g., as described above in connection with FIG. 8). As described above, the timing offset value may be based at least in part on a cyclic prefix duration of the PRACH sequence or a modified (e.g., reduced) cyclic prefix duration of the PRACH sequence (e.g., as described below in more detail). In some aspects, without a timing offset value signaled by the base station 110, the UE 120 may determine (e.g., autonomously without signaling and/or or configuration by the base station 110) a timing offset value based in part on the error in estimating the propagation delay.

As shown by reference number 940, if the estimated propagation delay by the UE 120 is accurate (e.g., a zero delay scenario), the base station 110 may receive the PRACH sequence after the trailing slot boundary of the intended resource allocation or the reserved slot due to the delay in transmission that is based at least in part on the timing offset value. However, as the network resource reservation includes time domain resources in the slot after the reserved slot for the PRACH sequence, the base station 110 may successfully receive the PRACH sequence (e.g., using the network resource reservation) while also avoiding potential interference with communications received during the slot after the reserved slot for the PRACH sequence. As shown by reference number 945, if the estimated propagation delay by the UE 120 is not accurate, the PRACH sequence may arrive at the base station 110 at or near the slot boundary (e.g., in the intended resource allocation or the reserved slot) due to the delay in transmission that is based at least in part on the timing offset value (e.g., a negative delay scenario). Example 905 depicts a negative delay scenario in which the PRACH sequence arrives at the base station 110 at the slot boundary. In other negative delay scenarios, the PRACH sequence may arrive at the base station 110 after the after the trailing slot boundary of the intended resource allocation or the reserved slot due to the delay in transmission. However, the base station 110 may account for this using the extended network resource reservation, as described above.

As shown by reference number 950, if the estimated propagation delay by the UE 120 is not accurate, the PRACH sequence may arrive at the base station 110 after the trailing slot boundary of the intended resource allocation or the reserved slot (e.g., and later than the zero delay scenario). However, the base station 110 may account for this using the extended network resource reservation, as described above. As a result, the base station 110 may account for negative delay scenarios and/or positive delay scenarios using the techniques and resource allocations/reservations described above in connection with example 900 and/or 905.

As shown in FIG. 9, and example 910, the UE 120 and/or the base station 110 may account for negative delay scenarios and/or positive delay scenarios by modifying a cyclic prefix duration of a PRACH sequence. For example, as described above in connection with FIG. 8, the UE 120 (and/or the base station 110) may modify a PRACH format of the PRACH sequence prior to transmitting the PRACH sequence by modifying the cyclic prefix duration of the PRACH format. In some aspects, the UE 120 may reduce the cyclic prefix duration by a factor. For example, as shown in FIG. 9, the cyclic prefix duration of the PRACH sequence in example 910 may be less than the cyclic prefix duration of the PRACH sequence in example 900 and/or example 905. The UE 120 may autonomously modify the cyclic prefix duration. Alternatively, the base station 110 may indicate the modified cyclic prefix duration to the UE 120.

The UE 120 may determine a timing offset value that may be based at least in part on the modified cyclic prefix duration (e.g., the second cyclic prefix duration). For example, the timing offset value may be a portion or a factor of the modified cyclic prefix duration (e.g., the second cyclic prefix duration). In some aspects, the timing offset value may be $(1-f)/2*T$, where T is the cyclic prefix duration, f is between 0 and 1, and $f*T$ is the modified cyclic prefix duration (e.g., the second cyclic prefix duration). In some aspects, the value of f may be one half (e.g., 0.5). In some aspects, the UE 120 may autonomously (e.g., without signaling and/or configuration from the base station 110) determine the modified cyclic prefix duration and timing offset value. In some aspects, the base station 110 may indicate the modified cyclic prefix duration and/or the timing offset value. For example, the base station 110 may indicate that the timing offset value is a portion or factor of the cyclic prefix duration (e.g., the base station 110 may indicate that the timing offset value is to be half of the cyclic prefix duration). The UE 120 may autonomously modify the cyclic prefix duration and determine the timing offset value based at least in part on the indicated portion or factor of the modified cyclic prefix duration (e.g., half of the modified cyclic prefix duration). The base station 110 may reserve the network resource reservation in a similar manner as described above in connection with example 900 and/or example 905.

By modifying the cyclic prefix duration, the base station 110 is enabled to reduce the network resource reservation for the PRACH sequence, thereby conserving network resources. For example, as the timing offset value may be based at least in part on the modified (e.g., reduced) cyclic prefix duration, the base station 110 may be enabled to reserve fewer resources as an amount of time that the transmission of the PRACH sequence may be delayed by the UE 120 is reduced. As a result, the UE 120 and/or the base station 110 are enabled to account for zero delay scenarios (e.g., as shown by reference number 955), negative delay scenarios (e.g., as shown by reference number 960), and/or positive delay scenarios (e.g., as shown by reference number 965) in a similar manner as described above.

As indicated above, FIG. 9 is provided as an example. Other examples may differ from what is described with respect to FIG. 9.

Figure 10:
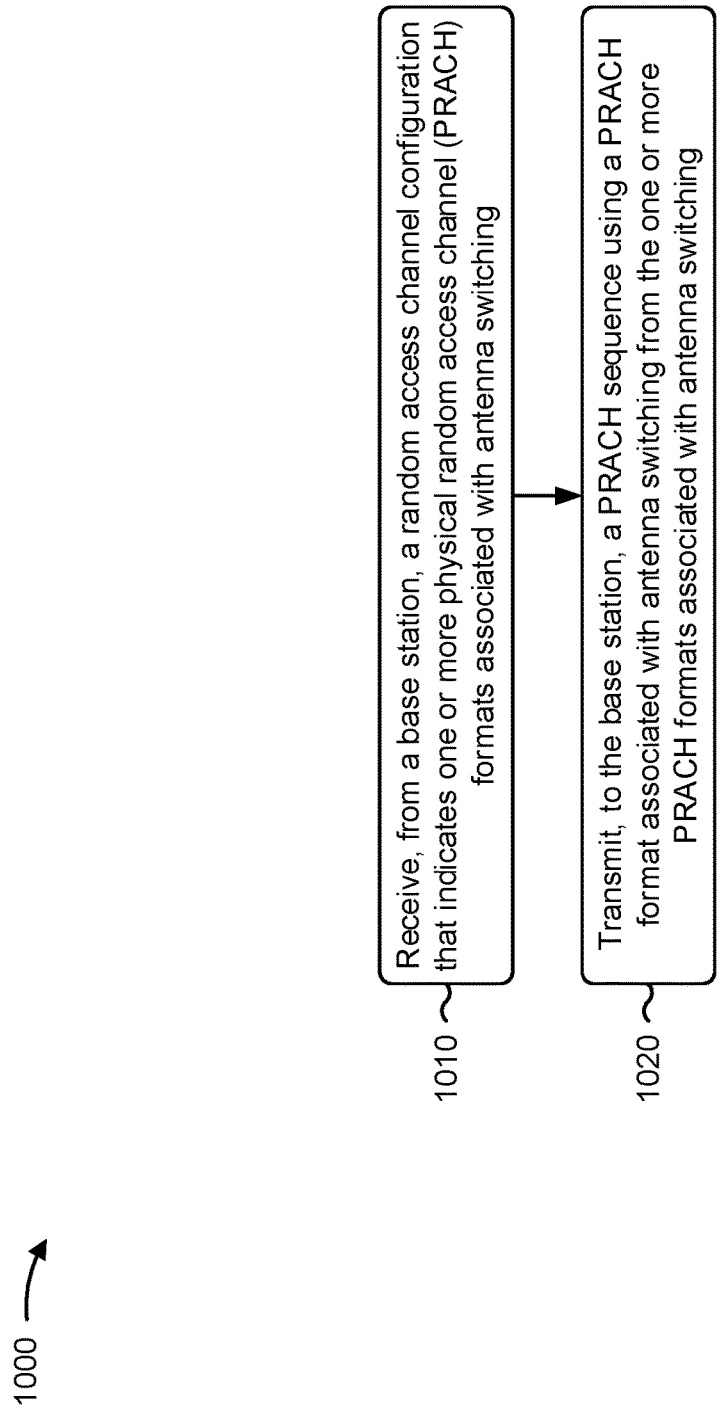
FIGS. 10-13 are diagrams illustrating example processes associated with a PRACH procedure, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120) performs operations associated with a PRACH procedure.

As shown in FIG. 10, in some aspects, process 1000 may include receiving, from a base station, a random access channel configuration that indicates one or more PRACH formats associated with antenna switching (block 1010). For example, the UE (e.g., using reception component 1402, depicted in FIG. 14) may receive, from a base station, a random access channel configuration that indicates one or more PRACH formats associated with antenna switching, as described above.

As further shown in FIG. 10, in some aspects, process 1000 may include transmitting, to the base station, a PRACH sequence using a PRACH format associated with antenna switching from the one or more PRACH formats associated with antenna switching (block 1020). For example, the UE (e.g., using transmission component 1404, depicted in FIG. 14) may transmit, to the base station, a PRACH sequence using a PRACH format associated with antenna switching from the one or more PRACH formats associated with antenna switching, as described above.

Process 1000 may include additional aspects, such as any single aspect or any combination of aspects described below and/or in connection with one or more other processes described elsewhere herein.

In a first aspect, the base station is included in a non-terrestrial network.

In a second aspect, alone or in combination with the first aspect, process 1000 includes transmitting, to the base station, an indication of an antenna switching capability of the UE.

In a third aspect, alone or in combination with the second aspect, transmitting the indication of the antenna switching capability of the UE comprises transmitting an indication of whether the UE supports transmit antenna switching.

In a fourth aspect, alone or in combination with one or more of the second through third aspects, transmitting the indication of the antenna switching capability of the UE comprises transmitting an indication of at least one of a number of antennas supported by the UE for uplink transmit antenna switching, or an antenna switching delay associated with the UE.

In a fifth aspect, alone or in combination with one or more of the first through fourth aspects, transmitting the PRACH sequence comprises transmitting a first one or more repetitions of the PRACH sequence using a first antenna, performing, at an antenna switch time, an antenna switch procedure to switch a transmit antenna from the first antenna to a second antenna, and transmitting a second one or more repetitions of the PRACH sequence using the second antenna.

In a sixth aspect, alone or in combination with the fifth aspect, the antenna switch time is included in a duration of a last repetition, in a time domain, included in the first one or more repetitions.

In a seventh aspect, alone or in combination with one or more of the fifth through sixth aspects, the antenna switch time is based at least in part on a duration of the PRACH sequence, wherein the duration of the PRACH sequence includes a duration of each repetition associated with the PRACH sequence and a duration of a cyclic prefix included in the PRACH sequence.

In an eighth aspect, alone or in combination with one or more of the fifth through seventh aspects, the antenna switch time occurs an amount of time prior to the end of a last repetition, in a time domain, included in the first one or more repetitions, wherein the amount of time is based at least in part on a duration of a cyclic prefix included in the PRACH sequence.

In a ninth aspect, alone or in combination with one or more of the fifth through eighth aspects, process 1000 includes identifying the antenna switch time based at least in part on a stored configuration.

In a tenth aspect, alone or in combination with one or more of the fifth through eighth aspects, receiving the random access channel configuration comprises receiving an indication of the antenna switch time.

In an eleventh aspect, alone or in combination with one or more of the first through tenth aspects, receiving the random access channel configuration comprises receiving an indication of the PRACH format from the one or more PRACH formats, wherein the PRACH format indicates that the PRACH sequence is to include one or more repetitions and indicates that the UE is to perform antenna switching when transmitting the PRACH sequence.

In a twelfth aspect, alone or in combination with one or more of the first through tenth aspects, receiving the random access channel configuration comprises receiving an indication of the PRACH format from the one or more PRACH formats, and receiving an indication of whether the UE is to perform antenna switching when transmitting the PRACH sequence using the PRACH format.

In a thirteenth aspect, alone or in combination with one or more of the first through tenth aspects, process 1000 includes receiving an indication of a first set of random access channel occasions that are associated with antenna switching by the UE and a second set of random access channel occasions that are not associated with antenna switching by the UE.

In a fourteenth aspect, alone or in combination with the thirteenth aspect, receiving the random access channel configuration comprises receiving an indication of a random access channel occasion, included in the first set of random access channel occasions or the second set of random access channel occasions, associated with the PRACH sequence, and determining whether to perform antenna switching when transmitting the PRACH sequence based at least in part on whether the random access channel occasion is included in the first set of random access channel occasions or the second set of random access channel occasions.

In a fifteenth aspect, alone or in combination with one or more of the first through fourteenth aspects, receiving the random access channel configuration comprises receiving an indication of the PRACH format from the one or more PRACH formats, wherein the PRACH format includes one or more repetition groups and an indication that antenna switching is to be used by the UE when transmitting the PRACH sequence.

In a sixteenth aspect, alone or in combination with the fifteenth aspect, a repetition group includes one or more repetitions of the PRACH sequence.

In a seventeenth aspect, alone or in combination with one or more of the fifteenth through sixteenth aspects, each repetition group of the one or more repetition groups include a cyclic prefix.

In an eighteenth aspect, alone or in combination with one or more of the fifteenth through seventeenth aspects, receiving the indication of the PRACH format comprises receiving an indication that the UE is to perform an antenna switching procedure at the end of at least one of the one or more repetition groups.

In a nineteenth aspect, alone or in combination with one or more of the fifteenth through eighteenth aspects, receiving the indication of the PRACH format comprises receiving an indication of a starting time of each repetition group included in the one or more repetition groups, wherein the starting time is based at least in part on an amount of time associated with an antenna switching capability of the UE.

In a twentieth aspect, alone or in combination with one or more of the fifteenth through eighteenth aspects, receiving the indication of the PRACH format comprises receiving an indication of a time gap between each repetition group included in the one or more repetition groups.

In a twenty-first aspect, alone or in combination with one or more of the fifteenth through twentieth aspects, transmitting the PRACH sequence comprises transmitting a first repetition group of the one or more repetition groups of the PRACH sequence using a first antenna, performing, after transmitting the first repetition group, an antenna switch procedure to switch a transmit antenna from the first antenna to a second antenna, and transmitting a second repetition group of the one or more repetition groups of the PRACH sequence using the second antenna.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
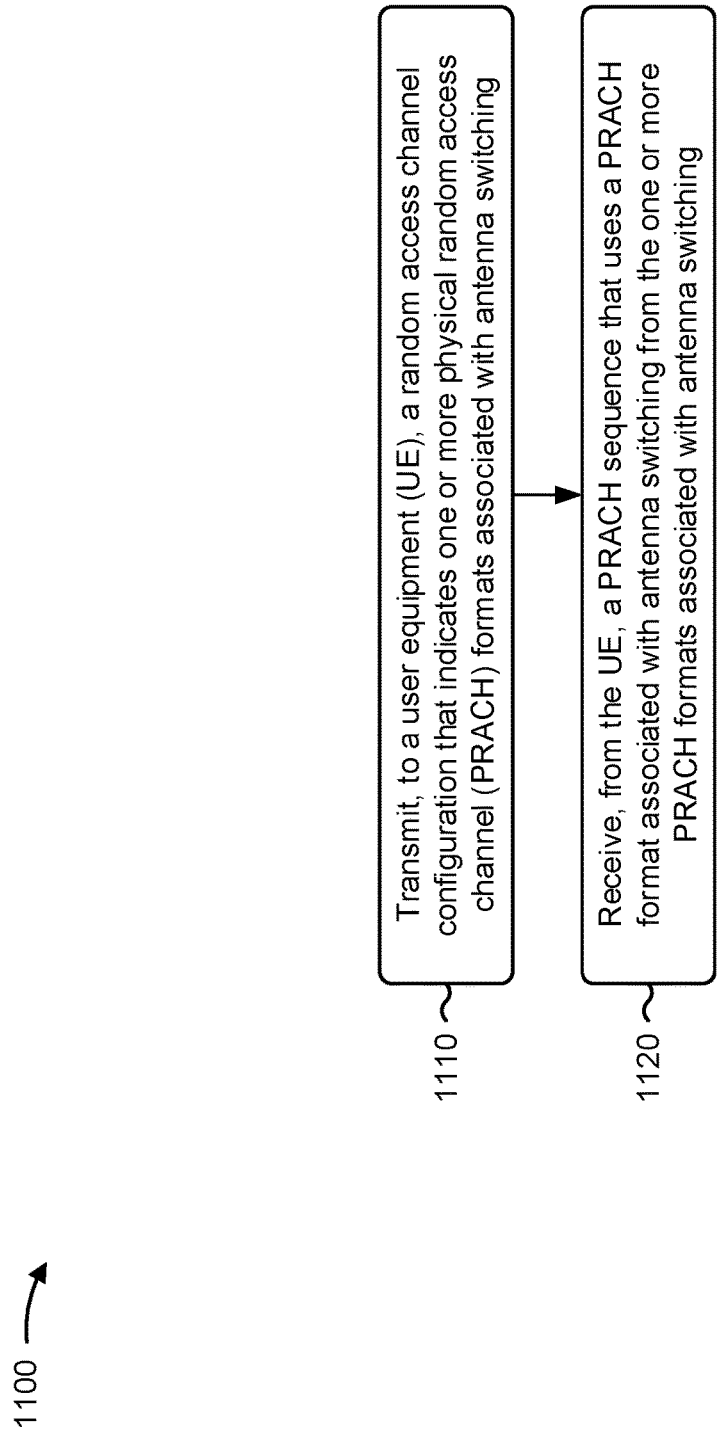

FIG. 11 is a diagram illustrating an example process 1100 performed, for example, by a base station, in accordance with various aspects of the present disclosure. Example process 1100 is an example where the base station (e.g., base station 110 and/or a satellite that includes base station 110) performs operations associated with a PRACH procedure.

As shown in FIG. 11, in some aspects, process 1100 may include transmitting, to a UE, a random access channel configuration that indicates one or more PRACH formats associated with antenna switching (block 1110). For example, the base station (e.g., using transmission component 1504, depicted in FIG. 15) may transmit, to a UE, a random access channel configuration that indicates one or more PRACH formats associated with antenna switching, as described above.

As further shown in FIG. 11, in some aspects, process 1100 may include receiving, from the UE, a PRACH sequence that uses a PRACH format associated with antenna switching from the one or more PRACH formats associated with antenna switching (block 1120). For example, the base station (e.g., using reception component 1502, depicted in FIG. 15) may receive, from the UE, a PRACH sequence that uses a PRACH format associated with antenna switching from the one or more PRACH formats associated with antenna switching, as described above.

Process 1100 may include additional aspects, such as any single aspect or any combination of aspects described below and/or in connection with one or more other processes described elsewhere herein.

In a first aspect, the base station is included in a non-terrestrial network.

In a second aspect, alone or in combination with the first aspect, process 1100 includes receiving, from the UE, an indication of an antenna switching capability of the UE.

In a third aspect, alone or in combination with the second aspect, receiving the indication of the antenna switching capability of the UE comprises receiving an indication of whether the UE supports transmit antenna switching.

In a fourth aspect, alone or in combination with one or more of the second through third aspects, receiving the indication of the antenna switching capability of the UE comprises receiving an indication of at least one of a number of antennas supported by the UE for uplink transmit antenna switching, or an antenna switching delay associated with the UE.

In a fifth aspect, alone or in combination with one or more of the first through fourth aspects, receiving the PRACH sequence comprises receiving a first one or more repetitions of the PRACH sequence that are transmitted by the UE using a first antenna of the UE, and receiving a second one or more repetitions of the PRACH sequence that are transmitted by the UE using a second antenna of the UE.

In a sixth aspect, alone or in combination with the fifth aspect, a time that the UE performs an antenna switch procedure from the first antenna to the second antenna is included in a duration of a last repetition, in a time domain, included in the first one or more repetitions.

In a seventh aspect, alone or in combination with one or more of the fifth through sixth aspects, a time that the UE performs an antenna switch procedure from the first antenna to the second antenna is based at least in part on a duration of the PRACH sequence, wherein the duration of the PRACH sequence includes a duration of each repetition associated with the PRACH sequence and a duration of a cyclic prefix included in the PRACH sequence.

In an eighth aspect, alone or in combination with one or more of the fifth through seventh aspects, a time that the UE performs an antenna switch procedure from the first antenna to the second antenna occurs an amount of time prior to the end of a last repetition, in a time domain, included in the first one or more repetitions, wherein the amount of time is based at least in part on a duration of a cyclic prefix included in the PRACH sequence.

In a ninth aspect, alone or in combination with one or more of the fifth through eighth aspects, transmitting the random access channel configuration comprises transmitting an indication of a time that the UE is to perform an antenna switch procedure from the first antenna to the second antenna.

In a tenth aspect, alone or in combination with one or more of the first through ninth aspects, transmitting the random access channel configuration comprises transmitting an indication of the PRACH format from the one or more PRACH formats, wherein the PRACH format indicates that the PRACH sequence is to include one or more repetitions and indicates that the UE is to perform antenna switching when transmitting the PRACH sequence.

In an eleventh aspect, alone or in combination with one or more of the first through ninth aspects, transmitting the random access channel configuration comprises transmitting an indication of the PRACH format from the one or more PRACH formats, and transmitting an indication of whether the UE is to perform antenna switching when transmitting the PRACH sequence using the PRACH format.

In a twelfth aspect, alone or in combination with one or more of the first through ninth aspects, process 1100 includes transmitting, to the UE, an indication of a first set of random access channel occasions that are associated with antenna switching by the UE and a second set of random access channel occasions that are not associated with antenna switching by the UE.

In a thirteenth aspect, alone or in combination with the twelfth aspect, transmitting the random access channel configuration comprises transmitting an indication of a random access channel occasion, included in the first set of random access channel occasions or the second set of random access channel occasions, associated with the PRACH sequence, wherein an indication of whether the UE is to perform antenna switching is based at least in part on whether the random access channel occasion is included in the first set of random access channel occasions or the second set of random access channel occasions.

In a fourteenth aspect, alone or in combination with one or more of the first through thirteenth aspects, transmitting the random access channel configuration comprises transmitting an indication of the PRACH format from the one or more PRACH formats, wherein the PRACH format includes one or more repetition groups and an indication that antenna switching is to be used by the UE when transmitting the PRACH sequence.

In a fifteenth aspect, alone or in combination with the fourteenth aspect, a repetition group includes one or more repetitions of the PRACH sequence.

In a sixteenth aspect, alone or in combination with one or more of the fourteenth through fifteenth aspects, each repetition group of the one or more repetition groups include a cyclic prefix.

In a seventeenth aspect, alone or in combination with one or more of the fourteenth through sixteenth aspects, transmitting the indication of the PRACH format comprises transmitting an indication that the UE is to perform an antenna switching procedure at the end of at least one of the one or more repetition groups.

In an eighteenth aspect, alone or in combination with one or more of the fourteenth through seventeenth aspects, transmitting the indication of the PRACH format comprises transmitting an indication of a starting time of each repetition group included in the one or more repetition groups, wherein the starting time is based at least in part on an amount of time associated with an antenna switching capability of the UE.

In a nineteenth aspect, alone or in combination with one or more of the fourteenth through seventeenth aspects, transmitting the indication of the PRACH format comprises transmitting an indication of a time gap between each repetition group included in the one or more repetition groups.

In a twentieth aspect, alone or in combination with one or more of the fourteenth through nineteenth aspects, receiving the PRACH sequence comprises receiving a first repetition group of the one or more repetition groups of the PRACH sequence that is transmitted by the UE using a first antenna of the UE, and receiving a second repetition group of the one or more repetition groups of the PRACH sequence that is transmitted by the UE using a second antenna of the UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
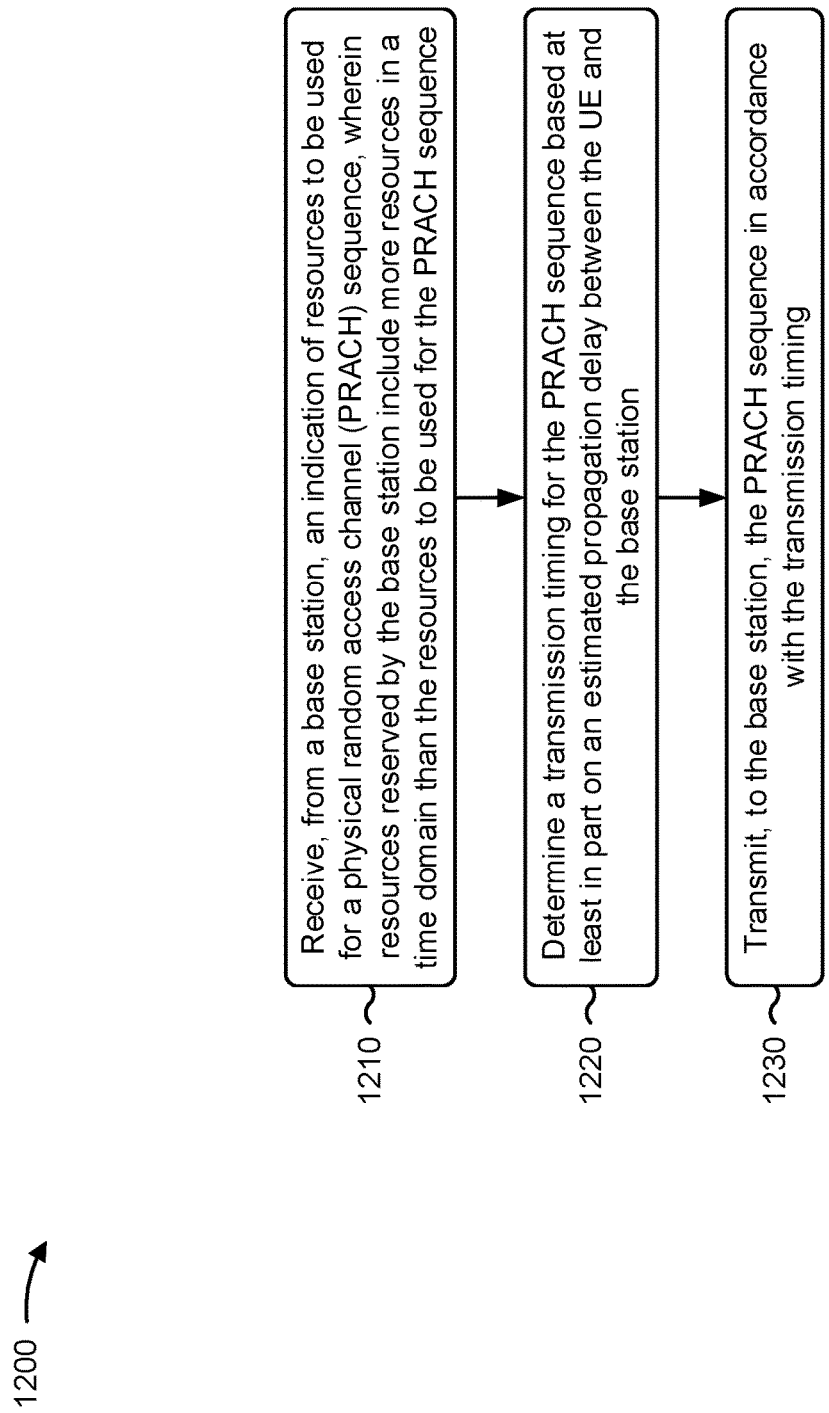

FIG. 12 is a diagram illustrating an example process 1200 performed, for example, by a UE, in accordance with various aspects of the present disclosure. Example process 1200 is an example where the UE (e.g., UE 120) performs operations associated with a PRACH procedure.

As shown in FIG. 12, in some aspects, process 1200 may include receiving, from a base station, an indication of resources to be used for a PRACH sequence, wherein resources reserved by the base station include more resources in a time domain than the resources to be used for the PRACH sequence (block 1210). For example, the UE (e.g., using reception component 1602, depicted in FIG. 16) may receive, from a base station, an indication of resources to be used for a PRACH sequence, wherein resources reserved by the base station include more resources in a time domain than the resources to be used for the PRACH sequence, as described above.

As further shown in FIG. 12, in some aspects, process 1200 may include determining a transmission timing for the PRACH sequence based at least in part on an estimated propagation delay between the UE and the base station (block 1220). For example, the UE (e.g., using determination component 1608, depicted in FIG. 16) may determine a transmission timing for the PRACH sequence based at least in part on an estimated propagation delay between the UE and the base station, as described above.

As further shown in FIG. 12, in some aspects, process 1200 may include transmitting, to the base station, the PRACH sequence in accordance with the transmission timing (block 1230). For example, the UE (e.g., using transmission component 1604, depicted in FIG. 16) may transmit, to the base station, the PRACH sequence in accordance with the transmission timing, as described above.

Process 1200 may include additional aspects, such as any single aspect or any combination of aspects described below and/or in connection with one or more other processes described elsewhere herein.

In a first aspect, the resources reserved by the base station include time domain resources that occur prior to time domain resources to be used for the PRACH sequence and include time domain resources that occur after the time domain resources to be used for the PRACH sequence.

In a second aspect, the resources reserved by the base station include time domain resources that occur after the time domain resources to be used for the PRACH sequence.

In a third aspect, alone or in combination with one or more of the first and second aspects, process 1200 includes receiving an indication of a timing offset value, wherein determining the transmission timing for the PRACH sequence comprises determining the transmission timing for the PRACH sequence based at least in part on the timing offset value.

In a fourth aspect, alone or in combination with the third aspect, the timing offset value is based at least in part on a duration of a cyclic prefix of the PRACH sequence.

In a fifth aspect, alone or in combination with one or more of the first through fourth aspects, process 1200 includes identifying a first cyclic prefix duration based at least in part on a PRACH format of the PRACH sequence, and modifying the first cyclic prefix duration by a factor to obtain a second cyclic prefix duration, wherein transmitting the PRACH sequence comprises transmitting the PRACH sequence with a cyclic prefix having the second cyclic prefix duration.

In a sixth aspect, alone or in combination with the fifth aspect, process 1200 includes identifying a timing offset value that is based at least in part on the second cyclic prefix duration, wherein determining the transmission timing for the PRACH sequence comprises determining the transmission timing for the PRACH sequence based at least in part on the timing offset value.

In a seventh aspect, alone or in combination with one or more of the first through sixth aspects, determining the transmission timing for the PRACH sequence comprises determining a first timing value that is based on the resources to be used for the PRACH sequence, subtracting, from the first timing value, the estimated propagation delay to obtain a second timing value, and adding, to the second timing value, a timing offset value to obtain a third timing value.

In an eighth aspect, alone or in combination with the seventh aspect, transmitting the PRACH sequence comprises transmitting the PRACH sequence at the third timing value.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
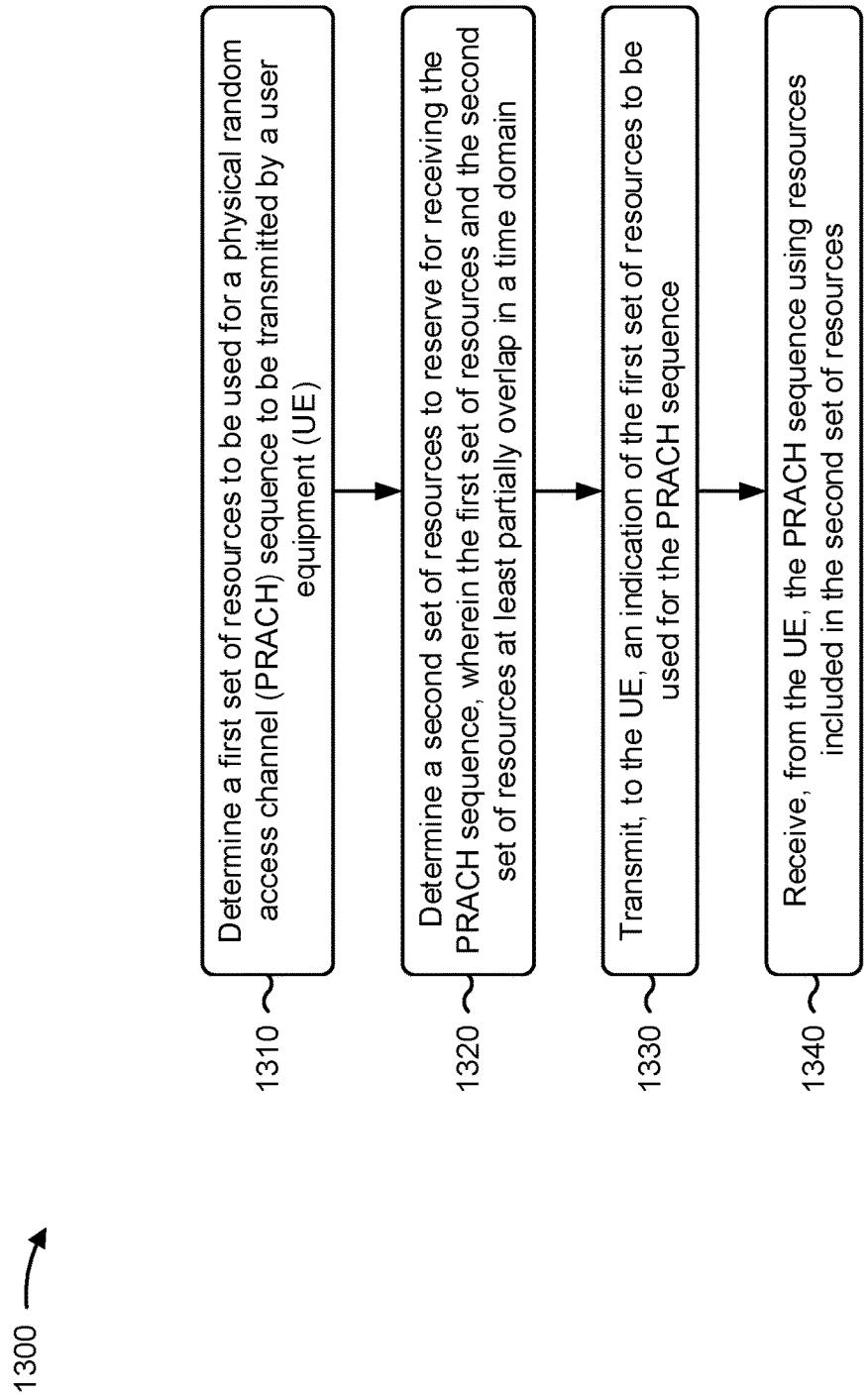

FIG. 13 is a diagram illustrating an example process 1300 performed, for example, by a base station, in accordance with various aspects of the present disclosure. Example process 1300 is an example where the base station (e.g., base station 110 and/or a satellite that includes base station 110) performs operations associated with a PRACH procedure.

As shown in FIG. 13, in some aspects, process 1300 may include determining a first set of resources to be used for a PRACH sequence to be transmitted by a UE (block 1310). For example, the base station (e.g., using determination component 1708, depicted in FIG. 17) may determine a first set of resources to be used for a PRACH sequence to be transmitted by a UE, as described above.

As further shown in FIG. 13, in some aspects, process 1300 may include determining a second set of resources to reserve for receiving the PRACH sequence, wherein the first set of resources and the second set of resources at least partially overlap in a time domain (block 1320). For example, the base station (e.g., using determination component 1708, depicted in FIG. 17) may determine a second set of resources to reserve for receiving the PRACH sequence, wherein the first set of resources and the second set of resources at least partially overlap in a time domain, as described above.

As further shown in FIG. 13, in some aspects, process 1300 may include transmitting, to the UE, an indication of the first set of resources to be used for the PRACH sequence (block 1330). For example, the base station (e.g., using transmission component 1704, depicted in FIG. 17) may transmit, to the UE, an indication of the first set of resources to be used for the PRACH sequence, as described above.

As further shown in FIG. 13, in some aspects, process 1300 may include receiving, from the UE, the PRACH sequence using resources included in the second set of resources (block 1340). For example, the base station (e.g., using reception component 1702, depicted in FIG. 17) may receive, from the UE, the PRACH sequence using resources included in the second set of resources, as described above.

Process 1300 may include additional aspects, such as any single aspect or any combination of aspects described below and/or in connection with one or more other processes described elsewhere herein.

In a first aspect, determining the second set of resources to reserve for receiving the PRACH sequence comprises determining that the second set of resources is to include time domain resources that occur prior to time domain resources of the first set of resources, and time domain resources that occur after the time domain resources of the first set of resources.

In a second aspect, determining the second set of resources to reserve for receiving the PRACH sequence comprises determining that the second set of resources is to include time domain resources that occur after the time domain resources of the first set of resources.

In a third aspect, alone or in combination with one or more of the first and second aspects, determining the second set of resources to reserve for receiving the PRACH sequence comprises determining that the second set of resources is to include additional time domain resources than time domain resources of the first set of resources, wherein an amount of the additional time domain resources is based at least in part on at least one of a duration of a cyclic prefix of the PRACH sequence, a negative propagation delay estimated by the UE, or a positive propagation delay estimated by the UE.

In a fourth aspect, alone or in combination with one or more of the first through third aspects, process 1300 includes transmitting an indication of a timing offset value to be used by the UE for a transmission timing of the PRACH sequence.

In a fifth aspect, alone or in combination with the fourth aspect, the timing offset value is based at least in part on a duration of a cyclic prefix of the PRACH sequence.

In a sixth aspect, alone or in combination with one or more of the first through fifth aspects, process 1300 includes identifying a first cyclic prefix duration based at least in part on a PRACH format of the PRACH sequence, modifying the first cyclic prefix duration by a factor to obtain a second cyclic prefix duration, and transmitting, to the UE, an indication of the second cyclic prefix duration to be used by the UE for the PRACH sequence.

In a seventh aspect, alone or in combination with the sixth aspect, process 1300 includes identifying a timing offset value that is based at least in part on the second cyclic prefix duration, and transmitting, to the UE, an indication of the timing offset value.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
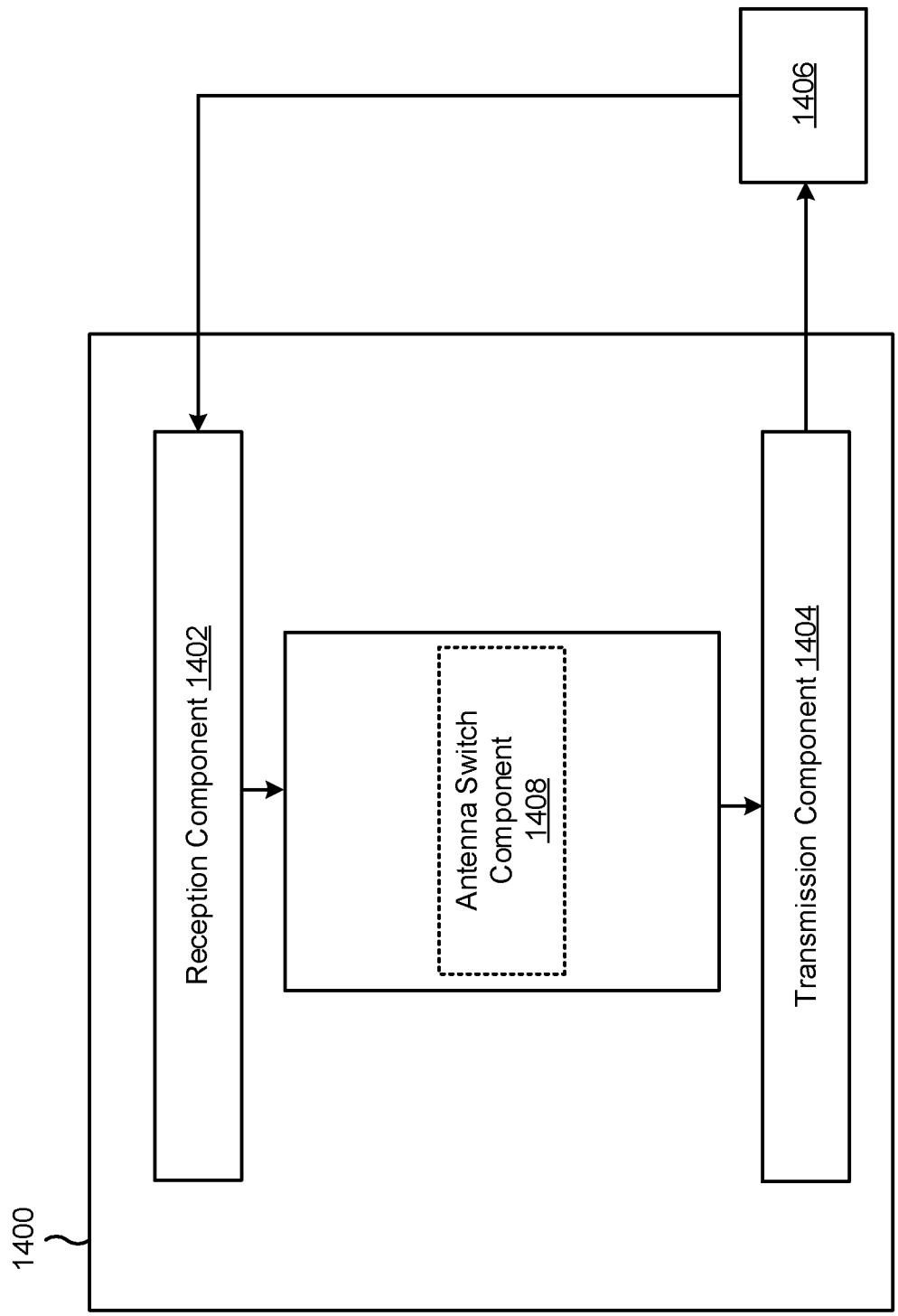
FIGS. 14-17 are block diagrams of example apparatuses for wireless communication, in accordance with various aspects of the present disclosure.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include an antenna switch component 1408, among other examples.

In some aspects, the apparatus 1400 may be configured to perform one or more operations described herein in connection with FIGS. 6, 7, 8, and/or 9. Additionally, or alternatively, the apparatus 1400 may be configured to perform one or more processes described herein, such as process 1000 of FIG. 10, or a combination thereof. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The reception component 1402 may receive, from a base station, a random access channel configuration that indicates one or more PRACH formats associated with antenna switching. The transmission component 1404 may transmit, to the base station, a PRACH sequence using a PRACH format associated with antenna switching from the one or more PRACH formats associated with antenna switching.

The transmission component 1404 may transmit, to the base station, an indication of an antenna switching capability of the UE.

The transmission component 1404 may transmit a first one or more repetitions of the PRACH sequence using a first antenna. The antenna switch component 1408 may perform, at an antenna switch time, an antenna switch procedure to switch a transmit antenna from the first antenna to a second antenna. The transmission component 1404 may transmit a second one or more repetitions of the PRACH sequence using the second antenna. The antenna switch component 1408 may identify the antenna switch time based at least in part on a stored configuration. The reception component 1402 may receive an indication of the antenna switch time The reception component 1402 may receive an indication of a first set of random access channel occasions that are associated with antenna switching by the UE and a second set of random access channel occasions that are not associated with antenna switching by the UE.

The reception component 1402 may receive an indication of the PRACH format from the one or more PRACH formats, wherein the PRACH format includes one or more repetition groups and an indication that antenna switching is to be used by the UE when transmitting the PRACH sequence.

The reception component 1402 may receive an indication that the UE is to perform an antenna switching procedure at the end of at least one of the one or more repetition groups. The reception component 1402 may receive an indication of a starting time of each repetition group included in the one or more repetition groups, wherein the starting time is based at least in part on an amount of time associated with an antenna switching capability of the UE.

The reception component 1402 may receive an indication of a time gap between each repetition group included in the one or more repetition groups.

The transmission component 1404 may transmit a first repetition group of the one or more repetition groups of the PRACH sequence using a first antenna. The antenna switch component 1408 may perform, after transmitting the first repetition group, an antenna switch procedure to switch a transmit antenna from the first antenna to a second antenna. The transmission component 1404 may transmit a second repetition group of the one or more repetition groups of the PRACH sequence using the second antenna.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
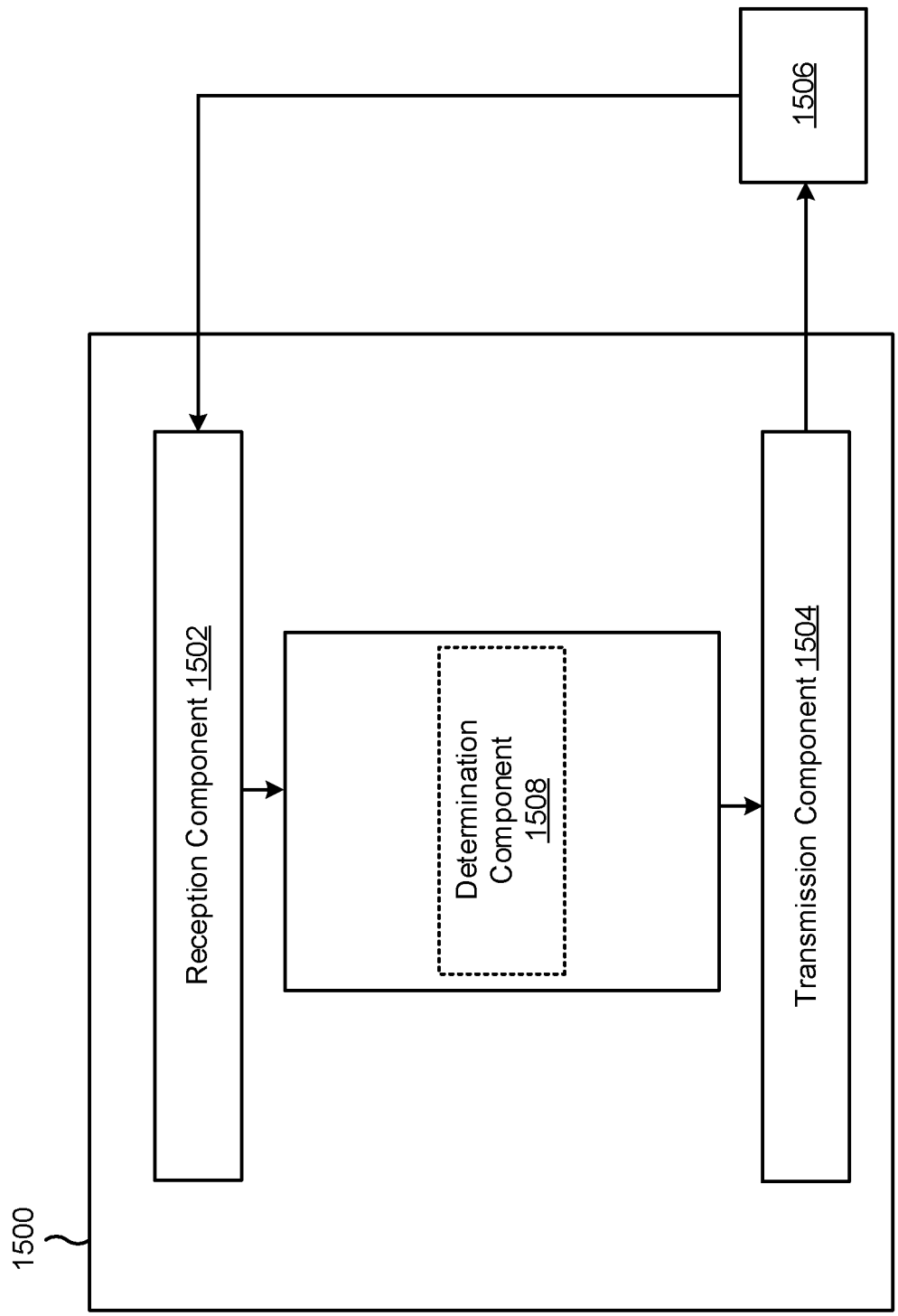

FIG. 15 is a block diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a determination component 1508, among other examples.

In some aspects, the apparatus 1500 may be configured to perform one or more operations described herein in connection with FIGS. 6, 7, 8, and/or 9. Additionally, or alternatively, the apparatus 1500 may be configured to perform one or more processes described herein, such as process 1100 of FIG. 11, or a combination thereof. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be co-located with the reception component 1502 in a transceiver.

The transmission component 1504 may transmit, to a UE, a random access channel configuration that indicates one or more PRACH formats associated with antenna switching. The reception component 1502 may receive, from the UE, a PRACH sequence that uses a PRACH format associated with antenna switching from the one or more PRACH formats associated with antenna switching. The determination component 1508 may determine the random access channel configuration.

The reception component 1502 may receive, from the UE, an indication of an antenna switching capability of the UE.

The reception component 1502 may receive a first one or more repetitions of the PRACH sequence that are transmitted by the UE using a first antenna of the UE. The reception component 1502 may receive a second one or more repetitions of the PRACH sequence that are transmitted by the UE using a second antenna of the UE.

The transmission component 1504 may transmit an indication of a time that the UE is to perform an antenna switch procedure from the first antenna to the second antenna.

The transmission component 1504 may transmit an indication of the PRACH format from the one or more PRACH formats, wherein the PRACH format indicates that the PRACH sequence is to include one or more repetitions and indicates that the UE is to perform antenna switching when transmitting the PRACH sequence.

The transmission component 1504 may transmit an indication of the PRACH format from the one or more PRACH formats. The transmission component 1504 may transmit an indication of whether the UE is to perform antenna switching when transmitting the PRACH sequence using the PRACH format.

The transmission component 1504 may transmit, to the UE, an indication of a first set of random access channel occasions that are associated with antenna switching by the UE and a second set of random access channel occasions that are not associated with antenna switching by the UE.

The transmission component 1504 may transmit an indication of a random access channel occasion, included in the first set of random access channel occasions or the second set of random access channel occasions, associated with the PRACH sequence. The transmission component 1504 may transmit an indication of the PRACH format from the one or more PRACH formats, wherein the PRACH format includes one or more repetition groups and an indication that antenna switching is to be used by the UE when transmitting the PRACH sequence.

The transmission component 1504 may transmit an indication that the UE is to perform an antenna switching procedure at the end of at least one of the one or more repetition groups. The transmission component 1504 may transmit an indication of a starting time of each repetition group included in the one or more repetition groups, wherein the starting time is based at least in part on an amount of time associated with an antenna switching capability of the UE. The transmission component 1504 may transmit an indication of a time gap between each repetition group included in the one or more repetition groups.

The reception component 1502 may receive a first repetition group of the one or more repetition groups of the PRACH sequence that is transmitted by the UE using a first antenna of the UE. The reception component 1502 may receive a second repetition group of the one or more repetition groups of the PRACH sequence that is transmitted by the UE using a second antenna of the UE.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
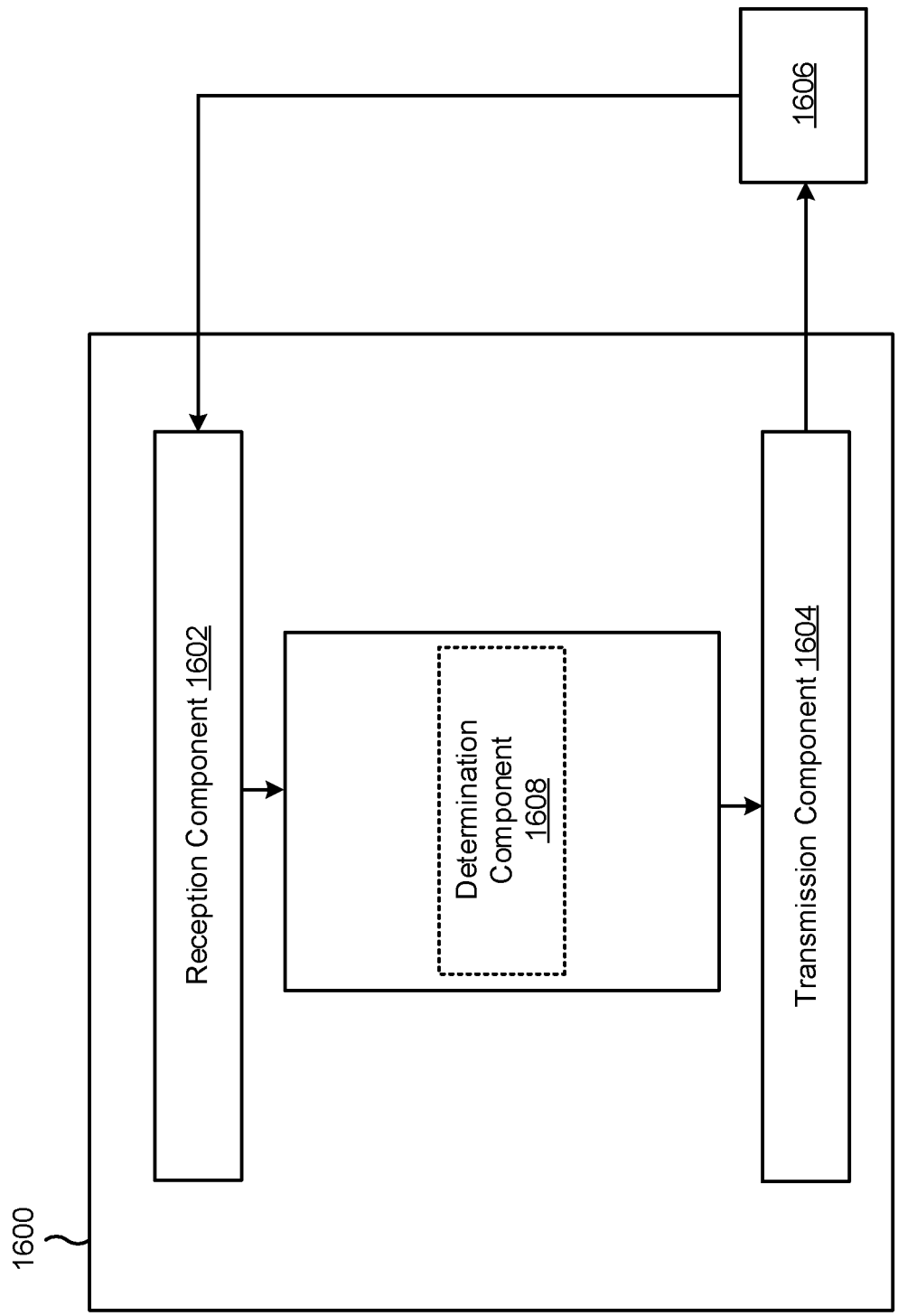

FIG. 16 is a block diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a determination component 1608, among other examples.

In some aspects, the apparatus 1600 may be configured to perform one or more operations described herein in connection with FIGS. 6, 7, 8, and/or 9. Additionally. or alternatively, the apparatus 1600 may be configured to perform one or more processes described herein, such as process 1300 of FIG. 13, or a combination thereof. In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be co-located with the reception component 1602 in a transceiver.

The reception component 1602 may receive, from a base station, an indication of resources to be used for a PRACH sequence, wherein resources reserved by the base station include more resources in a time domain than the resources to be used for the PRACH sequence. The determination component 1608 may determine a transmission timing for the PRACH sequence based at least in part on an estimated propagation delay between the UE and the base station. The transmission component 1604 may transmit, to the base station, the PRACH sequence in accordance with the transmission timing.

The reception component 1602 may receive an indication of a timing offset value. The determination component 1608 may determine transmission timing for the PRACH sequence based at least in part on the timing offset value.

The determination component 1608 may identify a first cyclic prefix duration based at least in part on a PRACH format of the PRACH sequence. The determination component 1608 may modify the first cyclic prefix duration by a factor to obtain a second cyclic prefix duration wherein transmitting the PRACH sequence comprises transmitting the PRACH sequence with a cyclic prefix having the second cyclic prefix duration. The determination component 1608 may identify a timing offset value that is based at least in part on the second cyclic prefix duration.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
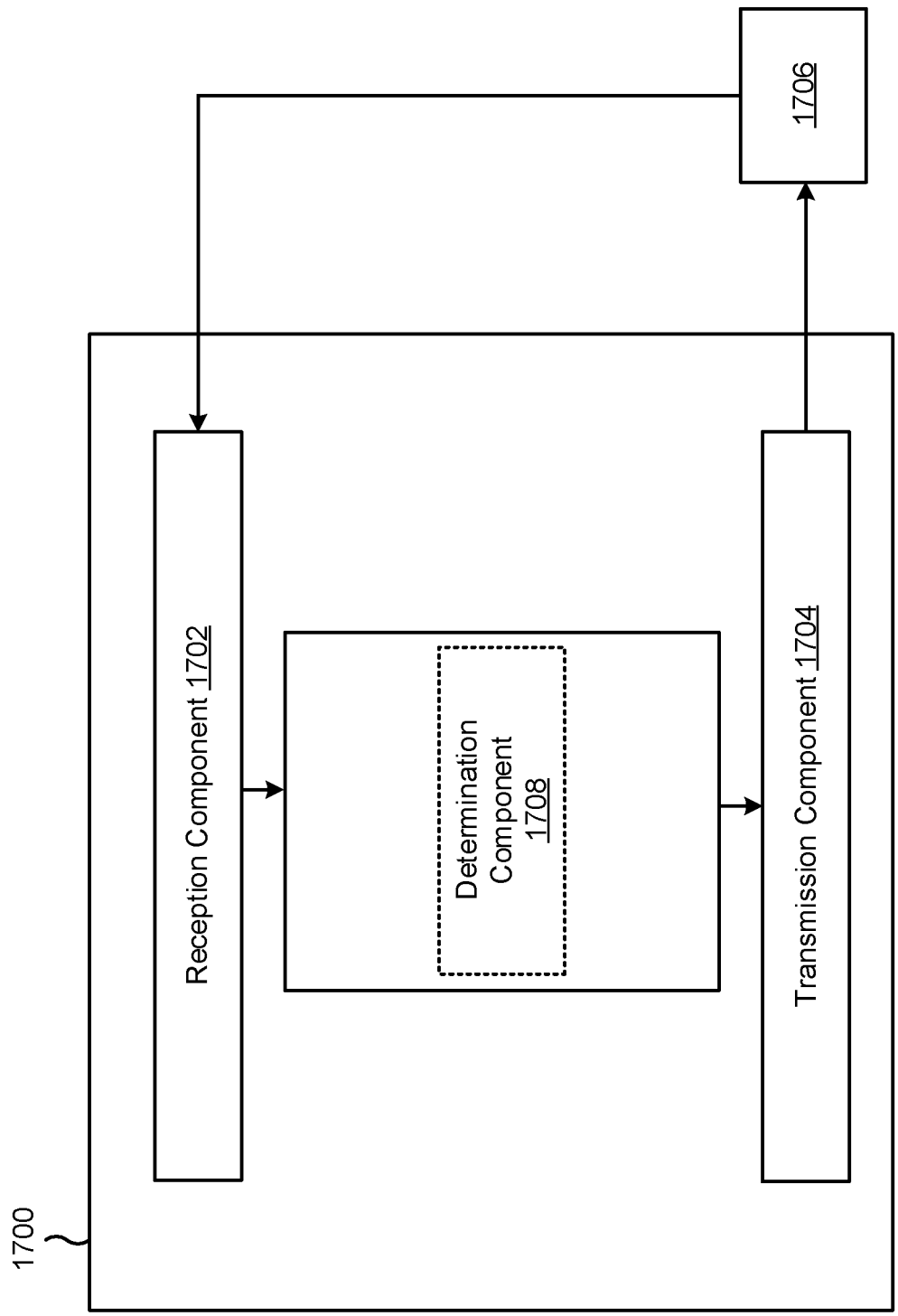

FIG. 17 is a block diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include a determination component 1708, among other examples.

In some aspects, the apparatus 1700 may be configured to perform one or more operations described herein in connection with FIGS. 6, 7, 8, and/or 9. Additionally. or alternatively, the apparatus 1700 may be configured to perform one or more processes described herein, such as process 1400 of FIG. 14, or a combination thereof. In some aspects, the apparatus 1700 and/or one or more components shown in FIG. 17 may include one or more components of the base station described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the base station described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the base station described above in connection with FIG. 2. In some aspects, the transmission component 1704 may be co-located with the reception component 1702 in a transceiver.

The determination component 1708 may determine a first set of resources to be used for a PRACH sequence to be transmitted by a UE. The determination component 1708 may determine a second set of resources to reserve for receiving the PRACH sequence, wherein the first set of resources and the second set of resources at least partially overlap in a time domain. The transmission component 1704 may transmit, to the UE, an indication of the first set of resources to be used for the PRACH sequence. The reception component 1702 may receive, from the UE, the PRACH sequence using resources included in the second set of resources. The transmission component 1704 may transmit an indication of a timing offset value to be used by the UE for a transmission timing of the PRACH sequence.

The determination component 1708 may identify a first cyclic prefix duration based at least in part on a PRACH format of the PRACH sequence. The determination component 1708 may modify the first cyclic prefix duration by a factor to obtain a second cyclic prefix duration. The transmission component 1704 may transmit, to the UE, an indication of the second cyclic prefix duration to be used by the UE for the PRACH sequence. The determination component 1708 may identify a timing offset value that is based at least in part on the second cyclic prefix duration. The transmission component 1704 may transmit, to the UE, an indication of the timing offset value.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some aspects of the present disclosure:

Aspect 1: A method of wireless communication performed by a user equipment (UE), comprising: receiving, from a base station, a random access channel configuration that indicates one or more physical random access channel (PRACH) formats associated with antenna switching; and transmitting, to the base station, a PRACH sequence using a PRACH format associated with antenna switching from the one or more PRACH formats associated with antenna switching.

Aspect 2: The method of aspect 1, wherein the base station is included in a non-terrestrial network.

Aspect 3: The method of any of aspects 1-2, further comprising: transmitting, to the base station, an indication of an antenna switching capability of the UE.

Aspect 4: The method of any of aspects 3, wherein transmitting the indication of the antenna switching capability of the UE comprises: transmitting an indication of whether the UE supports transmit antenna switching.

Aspect 5: The method of any of aspects 3-4, wherein transmitting the indication of the antenna switching capability of the UE comprises: transmitting an indication of at least one of: a number of antennas supported by the UE for uplink transmit antenna switching, or an antenna switching delay associated with the UE.

Aspect 6: The method of any of aspects 1-5, wherein transmitting the PRACH sequence comprises: transmitting a first one or more repetitions of the PRACH sequence using a first antenna; performing, at an antenna switch time, an antenna switch procedure to switch a transmit antenna from the first antenna to a second antenna; and transmitting a second one or more repetitions of the PRACH sequence using the second antenna.

Aspect 7: The method of aspect 6, wherein the antenna switch time is included in a duration of a last repetition, in a time domain, included in the first one or more repetitions.

Aspect 8: The method of any of aspects 6-7, wherein the antenna switch time is based at least in part on a duration of the PRACH sequence, wherein the duration of the PRACH sequence includes a duration of each repetition associated with the PRACH sequence and a duration of a cyclic prefix included in the PRACH sequence.

Aspect 9: The method of any of aspects 6-8, wherein the antenna switch time occurs an amount of time prior to the end of a last repetition, in a time domain, included in the first one or more repetitions, wherein the amount of time is based at least in part on a duration of a cyclic prefix included in the PRACH sequence.

Aspect 10: The method of any of aspects 6-9, further comprising: identifying the antenna switch time based at least in part on a stored configuration.

Aspect 11: The method of any of aspects 6-9, wherein receiving the random access channel configuration comprises: receiving an indication of the antenna switch time.

Aspect 12: The method of any of aspects 6-9, further comprising: identifying the antenna switch time based at least in part on a stored configuration; or receiving an indication of the antenna switch time.

Aspect 13: The method of any of aspects 1-12, wherein receiving the random access channel configuration comprises: receiving an indication of the PRACH format from the one or more PRACH formats, wherein the PRACH format indicates that the PRACH sequence is to include one or more repetitions and indicates that the UE is to perform antenna switching when transmitting the PRACH sequence.

Aspect 14: The method of any of aspects 1-12, wherein receiving the random access channel configuration comprises: receiving an indication of the PRACH format from the one or more PRACH formats; and receiving an indication of whether the UE is to perform antenna switching when transmitting the PRACH sequence using the PRACH format.

Aspect 15: The method of any of aspects 1-12, further comprising: receiving an indication of a first set of random access channel occasions that are associated with antenna switching by the UE and a second set of random access channel occasions that are not associated with antenna switching by the UE.

Aspect 16: The method of aspect 15, wherein receiving the random access channel configuration comprises: receiving an indication of a random access channel occasion, included in the first set of random access channel occasions or the second set of random access channel occasions, associated with the PRACH sequence; and determining whether to perform antenna switching when transmitting the PRACH sequence based at least in part on whether the random access channel occasion is included in the first set of random access channel occasions or the second set of random access channel occasions.

Aspect 17 The method of any of aspects 1-12, further comprising: receiving an indication of a first set of random access channel occasions that are associated with antenna switching by the UE and a second set of random access channel occasions that are not associated with antenna switching by the UE; receiving an indication of a random access channel occasion, included in the first set of random access channel occasions or the second set of random access channel occasions, associated with the PRACH sequence; and determining whether to perform antenna switching when transmitting the PRACH sequence based at least in part on whether the random access channel occasion is included in the first set of random access channel occasions or the second set of random access channel occasions.

Aspect 18: The method of any of aspects 1-17, wherein receiving the random access channel configuration comprises: receiving an indication of the PRACH format from the one or more PRACH formats, wherein the PRACH format includes one or more repetition groups and an indication that antenna switching is to be used by the UE when transmitting the PRACH sequence.

Aspect 19: The method of aspect 18, wherein a repetition group includes one or more repetitions of the PRACH sequence.

Aspect 20: The method of any of aspects 18-19, wherein each repetition group of the one or more repetition groups include a cyclic prefix.

Aspect 21: The method of any of aspects 18-20, wherein receiving the indication of the PRACH format comprises: receiving an indication that the UE is to perform an antenna switching procedure at the end of at least one of the one or more repetition groups.

Aspect 22: The method of any of aspects 18-21, wherein receiving the indication of the PRACH format comprises: receiving an indication of a starting time of each repetition group included in the one or more repetition groups, wherein the starting time is based at least in part on an amount of time associated with an antenna switching capability of the UE.

Aspect 23: The method of any of aspects 18-21, wherein receiving the indication of the PRACH format comprises: receiving an indication of a time gap between each repetition group included in the one or more repetition groups.

Aspect 24: The method of any of aspects 18-21, wherein receiving the indication of the PRACH format comprises: receiving an indication of at least one of: a starting time of each repetition group included in the one or more repetition groups, wherein the starting time is based at least in part on an amount of time associated with an antenna switching capability of the UE, or an indication of a time gap between each repetition group included in the one or more repetition groups.

Aspect 25: The method of any of aspects 18-24, wherein transmitting the PRACH sequence comprises: transmitting a first repetition group of the one or more repetition groups of the PRACH sequence using a first antenna; performing, after transmitting the first repetition group, an antenna switch procedure to switch a transmit antenna from the first antenna to a second antenna; and transmitting a second repetition group of the one or more repetition groups of the PRACH sequence using the second antenna.

Aspect 26: A method of wireless communication performed by a base station, comprising: transmitting, to a user equipment (UE), a random access channel configuration that indicates one or more physical random access channel (PRACH) formats associated with antenna switching; and receiving, from the UE, a PRACH sequence that uses a PRACH format associated with antenna switching from the one or more PRACH formats associated with antenna switching.

Aspect 27: The method of aspect 26, wherein the base station is included in a non-terrestrial network.

Aspect 28: The method of any of aspects 26-27, further comprising: receiving, from the UE, an indication of an antenna switching capability of the UE.

Aspect 29: The method of aspect 28, wherein receiving the indication of the antenna switching capability of the UE comprises: receiving an indication of whether the UE supports transmit antenna switching.

Aspect 30: The method of any of aspects 28-29, wherein receiving the indication of the antenna switching capability of the UE comprises: receiving an indication of at least one of: a number of antennas supported by the UE for uplink transmit antenna switching, or an antenna switching delay associated with the UE.

Aspect 31: The method of any of aspects 26-30, wherein receiving the PRACH sequence comprises: receiving a first one or more repetitions of the PRACH sequence that are transmitted by the UE using a first antenna of the UE; and receiving a second one or more repetitions of the PRACH sequence that are transmitted by the UE using a second antenna of the UE.

Aspect 32: The method of aspect 31, wherein a time that the UE performs an antenna switch procedure from the first antenna to the second antenna is included in a duration of a last repetition, in a time domain, included in the first one or more repetitions.

Aspect 33: The method of any of aspects 31-32, wherein a time that the UE performs an antenna switch procedure from the first antenna to the second antenna is based at least in part on a duration of the PRACH sequence, wherein the duration of the PRACH sequence includes a duration of each repetition associated with the PRACH sequence and a duration of a cyclic prefix included in the PRACH sequence.

Aspect 34: The method of any of aspects 31-33, wherein a time that the UE performs an antenna switch procedure from the first antenna to the second antenna occurs an amount of time prior to the end of a last repetition, in a time domain, included in the first one or more repetitions, wherein the amount of time is based at least in part on a duration of a cyclic prefix included in the PRACH sequence.

Aspect 35: The method of any of aspects 31-34, wherein transmitting the random access channel configuration comprises: transmitting an indication of a time that the UE is to perform an antenna switch procedure from the first antenna to the second antenna.

Aspect 36: The method of any of aspects 26-35, wherein transmitting the random access channel configuration comprises: transmitting an indication of the PRACH format from the one or more PRACH formats, wherein the PRACH format indicates that the PRACH sequence is to include one or more repetitions and indicates that the UE is to perform antenna switching when transmitting the PRACH sequence.

Aspect 37: The method of any of aspects 26-35, wherein transmitting the random access channel configuration comprises: transmitting an indication of the PRACH format from the one or more PRACH formats; and transmitting an indication of whether the UE is to perform antenna switching when transmitting the PRACH sequence using the PRACH format.

Aspect 38: The method of any of aspects 26-35, further comprising: transmitting, to the UE, an indication of a first set of random access channel occasions that are associated with antenna switching by the UE and a second set of random access channel occasions that are not associated with antenna switching by the UE.

Aspect 39: The method of aspect 38, wherein transmitting the random access channel configuration comprises: transmitting an indication of a random access channel occasion, included in the first set of random access channel occasions or the second set of random access channel occasions, associated with the PRACH sequence, wherein an indication of whether the UE is to perform antenna switching is based at least in part on whether the random access channel occasion is included in the first set of random access channel occasions or the second set of random access channel occasions.

Aspect 40: The method of any of aspects 26-39, wherein transmitting the random access channel configuration comprises: transmitting an indication of the PRACH format from the one or more PRACH formats, wherein the PRACH format includes one or more repetition groups and an indication that antenna switching is to be used by the UE when transmitting the PRACH sequence.

Aspect 41: The method of aspect 40, wherein a repetition group includes one or more repetitions of the PRACH sequence.

Aspect 42: The method of any of aspects 40-41, wherein each repetition group of the one or more repetition groups include a cyclic prefix.

Aspect 43: The method of any of aspects 40-42, wherein transmitting the indication of the PRACH format comprises: transmitting an indication that the UE is to perform an antenna switching procedure at the end of at least one of the one or more repetition groups.

Aspect 44: The method of any of aspects 40-43, wherein transmitting the indication of the PRACH format comprises: transmitting an indication of a starting time of each repetition group included in the one or more repetition groups, wherein the starting time is based at least in part on an amount of time associated with an antenna switching capability of the UE.

Aspect 45: The method of any of aspects 40-43, wherein transmitting the indication of the PRACH format comprises: transmitting an indication of a time gap between each repetition group included in the one or more repetition groups.

Aspect 46: The method of any of aspects 40-43, wherein receiving the PRACH sequence comprises: receiving a first repetition group of the one or more repetition groups of the PRACH sequence that is transmitted by the UE using a first antenna of the UE; and receiving a second repetition group of the one or more repetition groups of the PRACH sequence that is transmitted by the UE using a second antenna of the UE.

Aspect 47: A method of wireless communication performed by a user equipment (UE), comprising: receiving, from a base station, an indication of resources to be used for a physical random access channel (PRACH) sequence, wherein resources reserved by the base station include more resources in a time domain than the resources to be used for the PRACH sequence; determining a transmission timing for the PRACH sequence based at least in part on an estimated propagation delay between the UE and the base station; and transmitting, to the base station, the PRACH sequence in accordance with the transmission timing.

Aspect 48: The method of aspect 47, wherein the resources reserved by the base station include time domain resources that occur prior to time domain resources to be used for the PRACH sequence and include time domain resources that occur after the time domain resources to be used for the PRACH sequence.

Aspect 49: The method of aspect 47, wherein the resources reserved by the base station include time domain resources that occur after the time domain resources to be used for the PRACH sequence.

Aspect 50: The method of any of aspects 47-49, further comprising: receiving an indication of a timing offset value, wherein determining the transmission timing for the PRACH sequence comprises: determining the transmission timing for the PRACH sequence based at least in part on the timing offset value.

Aspect 51: The method of aspect 50, wherein the timing offset value is based at least in part on a duration of a cyclic prefix of the PRACH sequence.

Aspect 52: The method of any of aspects 47-51, further comprising: identifying a first cyclic prefix duration based at least in part on a PRACH format of the PRACH sequence; and modifying the first cyclic prefix duration by a factor to obtain a second cyclic prefix duration, wherein transmitting the PRACH sequence comprises transmitting the PRACH sequence with a cyclic prefix having the second cyclic prefix duration.

Aspect 53: The method of aspect 52, further comprising: identifying a timing offset value that is based at least in part on the second cyclic prefix duration, wherein determining the transmission timing for the PRACH sequence comprises: determining the transmission timing for the PRACH sequence based at least in part on the timing offset value.

Aspect 54: The method of any of aspects 47-53, wherein determining the transmission timing for the PRACH sequence comprises: determining a first timing value that is based on the resources to be used for the PRACH sequence; subtracting, from the first timing value, the estimated propagation delay to obtain a second timing value, and adding, to the second timing value, a timing offset value to obtain a third timing value.

Aspect 55: The method of aspect 54, wherein transmitting the PRACH sequence comprises: transmitting the PRACH sequence at the third timing value.

Aspect 56: A method of wireless communication performed by a base station, comprising: determining a first set of resources to be used for a physical random access channel (PRACH) sequence to be transmitted by a user equipment (UE); determining a second set of resources to reserve for receiving the PRACH sequence, wherein the first set of resources and the second set of resources at least partially overlap in a time domain; transmitting, to the UE, an indication of the first set of resources to be used for the PRACH sequence; and receiving, from the UE, the PRACH sequence using resources included in the second set of resources.

Aspect 57: The method of aspect 56, wherein determining the second set of resources to reserve for receiving the PRACH sequence comprises: determining that the second set of resources is to include: time domain resources that occur prior to time domain resources of the first set of resources, and time domain resources that occur after the time domain resources of the first set of resources.

Aspect 58: The method of aspect 56, wherein determining the second set of resources to reserve for receiving the PRACH sequence comprises: determining that the second set of resources is to include time domain resources that occur after the time domain resources of the first set of resources.

Aspect 59: The method of aspect 56, wherein determining the second set of resources to reserve for receiving the PRACH sequence comprises: determining that the second set of resources is to include additional time domain resources than time domain resources of the first set of resources, wherein an amount of the additional time domain resources is based at least in part on at least one of a duration of a cyclic prefix of the PRACH sequence, a negative propagation delay estimated by the UE, or a positive propagation delay estimated by the UE.

Aspect 60: The method of any of aspects 56-59, further comprising: transmitting an indication of a timing offset value to be used by the UE for a transmission timing of the PRACH sequence.

Aspect 61: The method of aspect 60, wherein the timing offset value is based at least in part on a duration of a cyclic prefix of the PRACH sequence.

Aspect 62: The method of any of aspects 56-61, further comprising: identifying a first cyclic prefix duration based at least in part on a PRACH format of the PRACH sequence; modifying the first cyclic prefix duration by a factor to obtain a second cyclic prefix duration; and transmitting, to the UE, an indication of the second cyclic prefix duration to be used by the UE for the PRACH sequence.

Aspect 63: The method of aspect 62, further comprising: identifying a timing offset value that is based at least in part on the second cyclic prefix duration; and transmitting, to the UE, an indication of the timing offset value.

Aspect 64: An apparatus for wireless communication at a device, comprising a processor; memory coupled with the processor; and instructions stored in the memory and executable by the processor to cause the apparatus to perform the method of one or more aspects of aspects 1-25.

Aspect 65: A device for wireless communication, comprising a memory and one or more processors coupled to the memory, the memory and the one or more processors configured to perform the method of one or more aspects of aspects 1-25.

Aspect 66: An apparatus for wireless communication, comprising at least one means for performing the method of one or more aspects of aspects 1-25.

Aspect 67: A non-transitory computer-readable medium storing code for wireless communication, the code comprising instructions executable by a processor to perform the method of one or more aspects of aspects 1-25.

Aspect 68: A non-transitory computer-readable medium storing a set of instructions for wireless communication, the set of instructions comprising one or more instructions that, when executed by one or more processors of a device, cause the device to perform the method of one or more aspects of aspects 1-25.

Aspect 69: An apparatus for wireless communication at a device, comprising a processor; memory coupled with the processor; and instructions stored in the memory and executable by the processor to cause the apparatus to perform the method of one or more aspects of aspects 26-46.

Aspect 70: A device for wireless communication, comprising a memory and one or more processors coupled to the memory, the memory and the one or more processors configured to perform the method of one or more aspects of aspects 26-46.

Aspect 71: An apparatus for wireless communication, comprising at least one means for performing the method of one or more aspects of aspects 26-46.

Aspect 72: A non-transitory computer-readable medium storing code for wireless communication, the code comprising instructions executable by a processor to perform the method of one or more aspects of aspects 26-46.

Aspect 73: A non-transitory computer-readable medium storing a set of instructions for wireless communication, the set of instructions comprising one or more instructions that, when executed by one or more processors of a device, cause the device to perform the method of one or more aspects of aspects 26-46.

Aspect 74: An apparatus for wireless communication at a device, comprising a processor; memory coupled with the processor; and instructions stored in the memory and executable by the processor to cause the apparatus to perform the method of one or more aspects of aspects 47-55.

Aspect 75: A device for wireless communication, comprising a memory and one or more processors coupled to the memory, the memory and the one or more processors configured to perform the method of one or more aspects of aspects 47-55.

Aspect 76: An apparatus for wireless communication, comprising at least one means for performing the method of one or more aspects of aspects 47-55.

Aspect 77: A non-transitory computer-readable medium storing code for wireless communication, the code comprising instructions executable by a processor to perform the method of one or more aspects of aspects 47-55.

Aspect 78: A non-transitory computer-readable medium storing a set of instructions for wireless communication, the set of instructions comprising one or more instructions that, when executed by one or more processors of a device, cause the device to perform the method of one or more aspects of aspects 47-55.

Aspect 79: An apparatus for wireless communication at a device, comprising a processor; memory coupled with the processor; and instructions stored in the memory and executable by the processor to cause the apparatus to perform the method of one or more aspects of aspects 56-63.

Aspect 80: A device for wireless communication, comprising a memory and one or more processors coupled to the memory, the memory and the one or more processors configured to perform the method of one or more aspects of aspects 56-63.

Aspect 81: An apparatus for wireless communication, comprising at least one means for performing the method of one or more aspects of aspects 56-63.

Aspect 82: A non-transitory computer-readable medium storing code for wireless communication, the code comprising instructions executable by a processor to perform the method of one or more aspects of aspects 56-63.

Aspect 83: A non-transitory computer-readable medium storing a set of instructions for wireless communication, the set of instructions comprising one or more instructions that, when executed by one or more processors of a device, cause the device to perform the method of one or more aspects of aspects 56-63.

Aspect 84: An apparatus for wireless communication at a device, comprising a processor; memory coupled with the processor; and instructions stored in the memory and executable by the processor to cause the apparatus to perform the method of one or more aspects of aspects 1-25 and 47-55.

Aspect 85: A device for wireless communication, comprising a memory and one or more processors coupled to the memory, the memory and the one or more processors configured to perform the method of one or more aspects of aspects 1-25 and 47-55.

Aspect 86: An apparatus for wireless communication, comprising at least one means for performing the method of one or more aspects of aspects 1-25 and 47-55.

Aspect 87: A non-transitory computer-readable medium storing code for wireless communication, the code comprising instructions executable by a processor to perform the method of one or more aspects of aspects 1-25 and 47-55.

Aspect 88: A non-transitory computer-readable medium storing a set of instructions for wireless communication, the set of instructions comprising one or more instructions that, when executed by one or more processors of a device, cause the device to perform the method of one or more aspects of aspects 1-25 and 47-55.

Aspect 89: An apparatus for wireless communication at a device, comprising a processor; memory coupled with the processor; and instructions stored in the memory and executable by the processor to cause the apparatus to perform the method of one or more aspects of aspects 26-46 and 56-63.

Aspect 90: A device for wireless communication, comprising a memory and one or more processors coupled to the memory, the memory and the one or more processors configured to perform the method of one or more aspects of aspects 26-46 and 56-63.

Aspect 91: An apparatus for wireless communication, comprising at least one means for performing the method of one or more aspects of aspects 26-46 and 56-63.

Aspect 92: A non-transitory computer-readable medium storing code for wireless communication, the code comprising instructions executable by a processor to perform the method of one or more aspects of aspects 26-46 and 56-63.

Aspect 93: A non-transitory computer-readable medium storing a set of instructions for wireless communication, the set of instructions comprising one or more instructions that, when executed by one or more processors of a device, cause the device to perform the method of one or more aspects of aspects 26-46 and 56-63.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
a memory comprising instructions; and
one or more processors configured to execute the instructions and cause the apparatus to:
obtain a random access channel configuration that indicates one or more physical random access channel (PRACH) formats associated with antenna switching from a first antenna to a second antenna; and
output for transmission a PRACH sequence using a PRACH format associated with antenna switching from the one or more PRACH formats associated with antenna switching.

2. The apparatus of claim 1, wherein the one or more processors are further configured to execute the instructions and cause the apparatus to:
output for transmission an indication of an antenna switching capability of the apparatus.

3. The apparatus of claim 1, wherein the one or more processors, to output for transmission the PRACH sequence, are configured to cause the apparatus to:
output for transmission a first one or more repetitions of the PRACH sequence using the first antenna;
perform, at an antenna switch time, an antenna switch procedure to switch from the first antenna to the second antenna; and
output for transmission a second one or more repetitions of the PRACH sequence using the second antenna.

4. The apparatus of claim 3, wherein the antenna switch time is included in a duration of a last repetition included in the first one or more repetitions.

5. The apparatus of claim 3, wherein the antenna switch time is based at least in part on a duration of the PRACH sequence, wherein the duration of the PRACH sequence includes a duration of each repetition associated with the PRACH sequence and a duration of a cyclic prefix included in the PRACH sequence.

6. The apparatus of claim 3, wherein the antenna switch time occurs an amount of time prior to an end of a last repetition included in the first one or more repetitions, wherein the amount of time is based at least in part on a duration of a cyclic prefix included in the PRACH sequence.

7. The apparatus of claim 3, wherein the one or more processors are further configured to execute the instructions and cause the apparatus to:
identify the antenna switch time based at least in part on a stored configuration; or
obtain an indication of the antenna switch time.

8. The apparatus of claim 1, wherein the memory and the one or more processors, to obtain the random access channel configuration, are configured to execute the instructions and cause the apparatus to:
obtain an indication of the PRACH format from the one or more PRACH formats, wherein the PRACH format indicates that the PRACH sequence is to include one or more repetitions and indicates that the apparatus is to perform antenna switching when outputting for transmission the PRACH sequence.

9. The apparatus of claim 1, wherein the one or more processors, to obtain the random access channel configuration, are configured to execute the instructions and cause the apparatus to:
obtain an indication of the PRACH format from the one or more PRACH formats; and
obtain an indication of whether the apparatus is to perform antenna switching when outputting for transmission the PRACH sequence using the PRACH format.

10. The apparatus of claim 1, wherein the one or more processors are further configured to execute the instructions and cause the apparatus to:
obtain an indication of a first set of random access channel occasions that are associated with antenna switching by the apparatus and a second set of random access channel occasions that are not associated with antenna switching by the apparatus;
obtain an indication of a random access channel occasion, included in the first set of random access channel occasions or the second set of random access channel occasions, associated with the PRACH sequence; and
selectively perform antenna switching when outputting for transmission the PRACH sequence based at least in part on whether the random access channel occasion is included in the first set of random access channel occasions or the second set of random access channel occasions.

11. The apparatus of claim 1, wherein the memory and the one or more processors, when receiving the random access channel configuration, are configured to execute the instructions and cause the apparatus to:
obtain an indication of the PRACH format from the one or more PRACH formats, wherein the PRACH format includes one or more repetition groups and an indication that antenna switching is to be used by the apparatus when outputting for transmission the PRACH sequence, wherein each repetition group of the one or more repetition groups includes: one or more repetitions of the PRACH sequence, and a cyclic prefix.

12. The apparatus of claim 11, wherein the one or more processors, when receiving the indication of the PRACH format, are configured to execute the instructions and cause the apparatus to perform at least one of:
obtain an indication that the apparatus is to perform an antenna switching procedure at an end of at least one of the one or more repetition group; or
obtain an indication of at least one of:
a starting time of each repetition group included in the one or more repetition groups, wherein the starting time is based at least in part on an amount of time associated with an antenna switching capability of the apparatus, or
a time gap between each repetition group included in the one or more repetition groups.

13. The apparatus of claim 1, further comprising at least one transceiver configured to receive the random access channel configuration and transmit the PRACH sequence using the PRACH format, wherein the apparatus is configured as a user equipment.

14. A method of wireless communication performed at a user equipment (UE), comprising:
receiving a random access channel configuration that indicates one or more physical random access channel (PRACH) formats associated with antenna switching from a first antenna of the UE to a second antenna of the UE; and
transmitting a PRACH sequence using a PRACH format associated with antenna switching from the one or more PRACH formats associated with antenna switching.

15. The method of claim 14, further comprising:
transmitting an indication of an antenna switching capability of the UE.

16. The method of claim 14, wherein transmitting the PRACH sequence comprises:
- transmitting a first one or more repetitions of the PRACH sequence using the first antenna;
- performing, at an antenna switch time, an antenna switch procedure to switch from the first antenna to the second antenna; and
- transmitting a second one or more repetitions of the PRACH sequence using the second antenna.

17. The method of claim 16, wherein the antenna switch time is included in a duration of a last repetition included in the first one or more repetitions.

18. The method of claim 16, wherein the antenna switch time is based at least in part on a duration of the PRACH sequence, wherein the duration of the PRACH sequence includes a duration of each repetition associated with the PRACH sequence and a duration of a cyclic prefix included in the PRACH sequence.

19. The method of claim 16, wherein the antenna switch time occurs an amount of time prior to an end of a last repetition, in a time domain, included in the first one or more repetitions, wherein the amount of time is based at least in part on a duration of a cyclic prefix included in the PRACH sequence.

20. The method of claim 16, further comprising:
- identifying the antenna switch time based at least in part on a stored configuration; or
- receiving an indication of the antenna switch time.

21. The method of claim 14, wherein receiving the random access channel configuration comprises:
- receiving an indication of the PRACH format from the one or more PRACH formats, wherein the PRACH format indicates that the PRACH sequence is to include one or more repetitions and indicates that the UE is to perform antenna switching when transmitting the PRACH sequence.

22. The method of claim 14, wherein receiving the random access channel configuration comprises:
- receiving an indication of the PRACH format from the one or more PRACH formats; and
- receiving an indication of whether the UE is to perform antenna switching when transmitting the PRACH sequence using the PRACH format.

23. The method of claim 14, further comprising:
- receiving an indication of a first set of random access channel occasions that are associated with antenna switching by the UE and a second set of random access channel occasions that are not associated with antenna switching by the UE;
- receiving an indication of a random access channel occasion, included in the first set of random access channel occasions or the second set of random access channel occasions, associated with the PRACH sequence; and
- determining whether to perform antenna switching when transmitting the PRACH sequence based at least in part on whether the random access channel occasion is included in the first set of random access channel occasions or the second set of random access channel occasions.

24. The method of claim 14, wherein receiving the random access channel configuration comprises:
- receiving an indication of the PRACH format from the one or more PRACH formats, wherein the PRACH format includes one or more repetition groups and an indication that antenna switching is to be used by the UE when transmitting the PRACH sequence, wherein each repetition group of the one or more repetition groups includes: one or more repetitions of the PRACH sequence, and a cyclic prefix.

25. The method of claim 24, wherein receiving the indication of the PRACH format comprises at least one of:
- receiving an indication that the UE is to perform an antenna switching procedure at an end of at least one of the one or more repetition groups, or
- receiving an indication of at least one of:
  - a starting time of each repetition group included in the one or more repetition groups, wherein the starting time is based at least in part on an amount of time associated with an antenna switching capability of the UE, or
  - an indication of a time gap between each repetition group included in the one or more repetition groups.

26. An apparatus for wireless communication, comprising:
- a memory comprising instructions; and
- one or more processors configured to execute the instructions and cause the apparatus to:
  - obtain an indication of resources reserved for the apparatus and to be used for a physical random access channel (PRACH) sequence; and
  - output for transmission, based at least in part on the indication of the reserved resources, the PRACH sequence in accordance with a transmission timing for the PRACH sequence.

27. The apparatus of claim 26, wherein the resources reserved for the apparatus include at least one of:
- time domain resources that occur prior to time domain resources to be used for the PRACH sequence, or
- time domain resources that occur after the time domain resources to be used for the PRACH sequence.

28. A method of wireless communication performed at a user equipment (UE), comprising:
- receiving an indication of resources reserved for the UE and to be used for a physical random access channel (PRACH) sequence; and
- transmitting, based at least in part on the indication of the resources, the PRACH sequence in accordance with a transmission timing for the PRACH sequence.

29. The method of claim 28, further comprising:
- identifying a first cyclic prefix duration based at least in part on a PRACH format of the PRACH sequence; and
- modifying the first cyclic prefix duration by a factor to obtain a second cyclic prefix duration,
  - wherein transmitting the PRACH sequence comprises transmitting the PRACH sequence with a cyclic prefix having the second cyclic prefix duration.

30. The apparatus of claim 26, further comprising at least one transceiver configured to receive the indication of resources to be used for the PRACH sequence and transmit the PRACH sequence in accordance with the transmission timing, wherein the apparatus is configured as a user equipment.

* * * * *